(12) United States Patent
Mi et al.

(10) Patent No.: US 11,228,204 B2
(45) Date of Patent: Jan. 18, 2022

(54) WIRELESS CAPACITIVE POWER TRANSFER DESIGNS AND SYSTEMS

(71) Applicants: SAN DIEGO STATE UNIVERSITY RESEARCH FOUNDATION, San Diego, CA (US); Chunting C. Mi, San Diego, CA (US); Fei Lu, San Diego, CA (US); Hua Zhang, San Diego, CA (US)

(72) Inventors: Chunting C. Mi, San Diego, CA (US); Fei Lu, San Diego, CA (US); Hua Zhang, San Diego, CA (US)

(73) Assignee: San Diego State University Research Foundation, San Diego, CA (US)

( * ) Notice: Subject to any disclaimer, the term of this patent is extended or adjusted under 35 U.S.C. 154(b) by 119 days.

(21) Appl. No.: 16/079,782

(22) PCT Filed: Mar. 22, 2017

(86) PCT No.: PCT/US2017/023687
§ 371 (c)(1),
(2) Date: Aug. 24, 2018

(87) PCT Pub. No.: WO2017/165577
PCT Pub. Date: Sep. 28, 2017

(65) Prior Publication Data
US 2021/0066961 A1    Mar. 4, 2021

Related U.S. Application Data

(60) Provisional application No. 62/311,921, filed on Mar. 23, 2016, provisional application No. 62/311,918, filed on Mar. 23, 2016.

(51) Int. Cl.
*H02J 50/00*      (2016.01)
*H02J 50/05*      (2016.01)
(Continued)

(52) U.S. Cl.
CPC .............. *H02J 50/05* (2016.02); *H02J 50/12* (2016.02); *H02J 50/80* (2016.02); *H04B 5/0037* (2013.01); *H04B 5/0012* (2013.01)

(58) Field of Classification Search
CPC . H02J 50/05; H02J 50/12; H02J 50/80; H04B 5/0037; H04B 5/0012
See application file for complete search history.

(56) References Cited

U.S. PATENT DOCUMENTS

| 8,937,409 B2 * | 1/2015 | Ichikawa | H02J 50/05 |
| | | | 307/104 |
| 9,000,621 B2 * | 4/2015 | Ichikawa | H02J 50/70 |
| | | | 307/104 |

(Continued)

FOREIGN PATENT DOCUMENTS

| WO | WO 2015/003962 A1 | 1/2015 |
| WO | WO 2015/177576 A1 | 11/2015 |

OTHER PUBLICATIONS

Komaru et al.; "Positional Characteristics of Capacitive Power Transfer as a Resonance Coupling System"; IEEE; 2013; pp. 218-221.*

(Continued)

*Primary Examiner* — Naum Levin
(74) *Attorney, Agent, or Firm* — Knobbe, Martens, Olson & Bear, LLP

(57) ABSTRACT

Embodiments described herein are directed to wireless power transfer systems, which can include a vertical pair of an inner and an outer coupling capacitors. According to certain embodiments, one plate from each of the outer coupling capacitor at least in part overlaps one plate of the inner coupling capacitor on a primary side and another plate from the outer coupling capacitor at least partially overlaps another plate of the inner coupling capacitor on a secondary side. Each plate of the outer coupling capacitor has a larger (Continued)

area than each plate of the inner coupling capacitor. Further, a power transfer unit is included and configured to transfer power capacitively through the vertical pair of coupling capacitors, where the power transfer unit can include first and second inductors coupled to each plate of the outer coupling capacitor, respectively.

7 Claims, 14 Drawing Sheets

(51) Int. Cl.
*H02J 50/80* (2016.01)
*H02J 50/12* (2016.01)
*H04B 5/00* (2006.01)

(56) References Cited

U.S. PATENT DOCUMENTS

| | | | | |
|---|---|---|---|---|
| 9,281,719 | B2* | 3/2016 | Ichikawa | H04B 5/0012 |
| 9,558,884 | B2* | 1/2017 | Shimokawa | H02J 5/005 |
| 9,831,710 | B2* | 11/2017 | Goma | H02J 50/05 |
| 9,866,194 | B2* | 1/2018 | Yoshida | H03H 7/38 |
| 9,979,206 | B2* | 5/2018 | Nyberg | H02J 50/05 |
| 10,033,225 | B2* | 7/2018 | Polu | H01F 38/14 |
| 10,153,664 | B2* | 12/2018 | Matsumoto | H02J 7/025 |
| 10,298,057 | B2* | 5/2019 | Mi | H02J 50/90 |
| 10,298,058 | B2* | 5/2019 | Afridi | H02J 50/05 |
| 2011/0037536 | A1 | 2/2011 | Kanno et al. | |
| 2012/0286583 | A1* | 11/2012 | Ichikawa | H01L 41/107 307/104 |
| 2014/0159502 | A1* | 6/2014 | Shimokawa | H02J 7/00034 307/104 |
| 2014/0197695 | A1 | 7/2014 | Waffenschmidt et al. | |
| 2014/0203663 | A1 | 7/2014 | Waffenschmidt et al. | |
| 2014/0339903 | A1* | 11/2014 | Goma | H02J 50/40 307/85 |
| 2017/0358392 | A1* | 12/2017 | Zhang | H01F 27/34 |
| 2018/0351402 | A1* | 12/2018 | Shi | F21V 29/70 |

OTHER PUBLICATIONS

Zhang et al.;"A Four-Plate Compact Capacitive Coupler Design and LCL-Compensated Topology for Capacitive Power Transfer in Electric Vehicle Charging Application"; IEEE; Date of publication Jan. 22, 2016; pp. 8541-8551.*
International Search Report and Written Opinion for PCT/US17/23687 dated Jun. 9, 2017, which is related to the present application.

* cited by examiner

WIRELESS CAPACITIVE POWER TRANSFER DESIGNS AND SYSTEMS

RELATED APPLICATIONS

This application claims the filing date of previously filed provisional applications 62/311,921, entitled "Inductive and Capacitive Combined Wireless Power Transfer System for Electric Vehicle Charging Applications," and 62/311,918, entitled "4-Plate Overlapping Structure for Capacitive Power Transfer," both filed Mar. 23, 2016, and are incorporated herein by reference.

FIELD

Embodiments of the invention relate to the field of wireless power transfer; and more specifically, to designs and systems for capacitive power transfer using LCL-compensated topology and LC-compensated topology.

BACKGROUND

Inductive power transfer (IPT) has been widely applied in the charging of portable devices and electric vehicles, for example. The efficiency of an IPT system from the direct current (dc) source to the dc load has reached 96% with 7 kW output power, which is already comparable to that of the traditional plug-in charger. However, the drawback of IPT technology lies in its sensitivity to conductive objects, such as metal debris in the air-gap. The magnetic fields generate eddy current losses in the metals nearby the system, causing significant temperature increase, which is dangerous in practice.

Capacitive power transfer (CPT) technology is an alternative solution to replace the IPT system. It utilizes electric fields to transfer power, instead of magnetic fields. The electric fields can pass through metal barriers without generating significant power losses. Therefore, the CPT technology is suitable for the electric vehicle charging application, for example.

Another advantage of the CPT system is its low cost. In CPT systems, metal plates are used to form capacitors to transfer power, while in IPT systems, the coils are made of expensive Litz-wire. The aluminum plate is a cost-efficient option, which additionally has good conductivity and low weight.

However, most of the traditional CPT systems focus on low power or very short distance applications. In particular, the transferred distance is usually around 1 mm, which is far less than the ground clearance of electric vehicles, limiting the application of CPT technology for certain applications.

This limitation of current CPT systems comes from the circuit topologies working with the coupling capacitors, which are classified into two categories: non-resonant and resonant topologies. The non-resonant topology is a PWM converter, such as the SEPIC converter. The coupling capacitors work as power storage components to smooth the power in the circuit. Therefore, it requires large capacitances, usually in the 10's of nF range, and the transferred distance is less than 1 mm. The resonant topologies include the series resonance converter and the class-E converter, in which the coupling capacitors resonate with the inductors in the compensation circuit. The benefit is that the coupling capacitance can be reduced as long as the resonant inductance or switching frequency is high enough. However, the inductance is limited by its self-resonant frequency and the switching frequency is limited by the efficiency and power capability of the converter. Another problem is that the resonant topology is sensitive to the parameter variations caused by misalignment, which is not acceptable in some critical applications. All these topologies require either too large capacitance or too high switching frequency, which is difficult to realize. Therefore, better circuit topologies are desirable for the CPT system.

The double-sided LCLC-compensated circuit has been proposed for high power and large air gap applications. The transferred distance is 150 mm and the output power reaches 2.4 kW with an efficiency of 91%. Although the coupling capacitor is around 10's of pF, there is a 100 pF capacitor connected in parallel with the coupling plates, which reduces the resonant inductor to 100's of μH and the switching frequency to 1 MHz. Therefore, the resonances are not affected by parameter variations and misalignments. However, there are eight external components in the compensation network that increase the complexity of the system and are difficult to construct. Also, the two pairs of plates are horizontally separated by 500 mm to eliminate the coupling between the adjacent plates. Therefore, the plates take more space than is often desired.

SUMMARY

As disclosed herein, a wireless power transfer system is described, including a vertical pair of an inner and an outer coupling capacitors. One plate from each of the outer coupling capacitor at least in part overlaps one plate of the inner coupling capacitor on a primary side and another plate from the outer coupling capacitor at least partially overlaps another plate of the inner coupling capacitor on a secondary side. Each plate of the outer coupling capacitor has a larger area than each plate of the inner coupling capacitor, and a distance between the primary and secondary sides is larger than distances between the plates of the inner and outer coupling capacitors on each of the primary and secondary sides, respectively. According to certain embodiments, a power transfer unit is included and configured to transfer power capacitively through the vertical pair of coupling capacitors.

Another embodiment of the present disclosure is directed to a wireless power transfer system as described above, where a power transfer unit is configured to transfer power capacitively through the vertical pair of coupling capacitors, and the power transfer unit includes first and second inductors coupled to each plate of the outer coupling capacitor, respectively.

Various other features and advantages will become obvious to one of ordinary skill in the art in light of the following detailed description and drawings.

BRIEF DESCRIPTION OF THE DRAWINGS

The accompanying drawing figures incorporated in and forming a part of this specification illustrate several aspects of the disclosure, and together with the description serve to explain the principles of the disclosure.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Figure 1A:
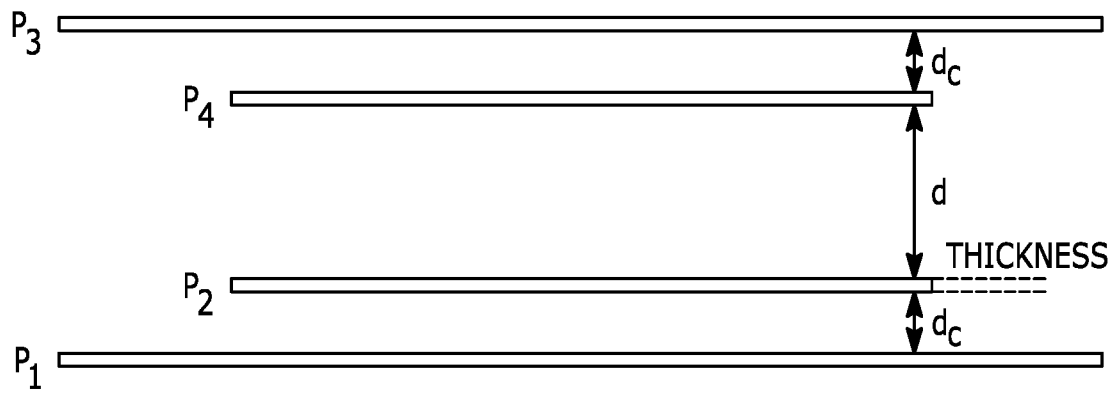
FIGS. 1(a) and 1(b) illustrate an exemplary 4-plate capacitive coupler design, according to an exemplary embodiment.
Figure 1B:
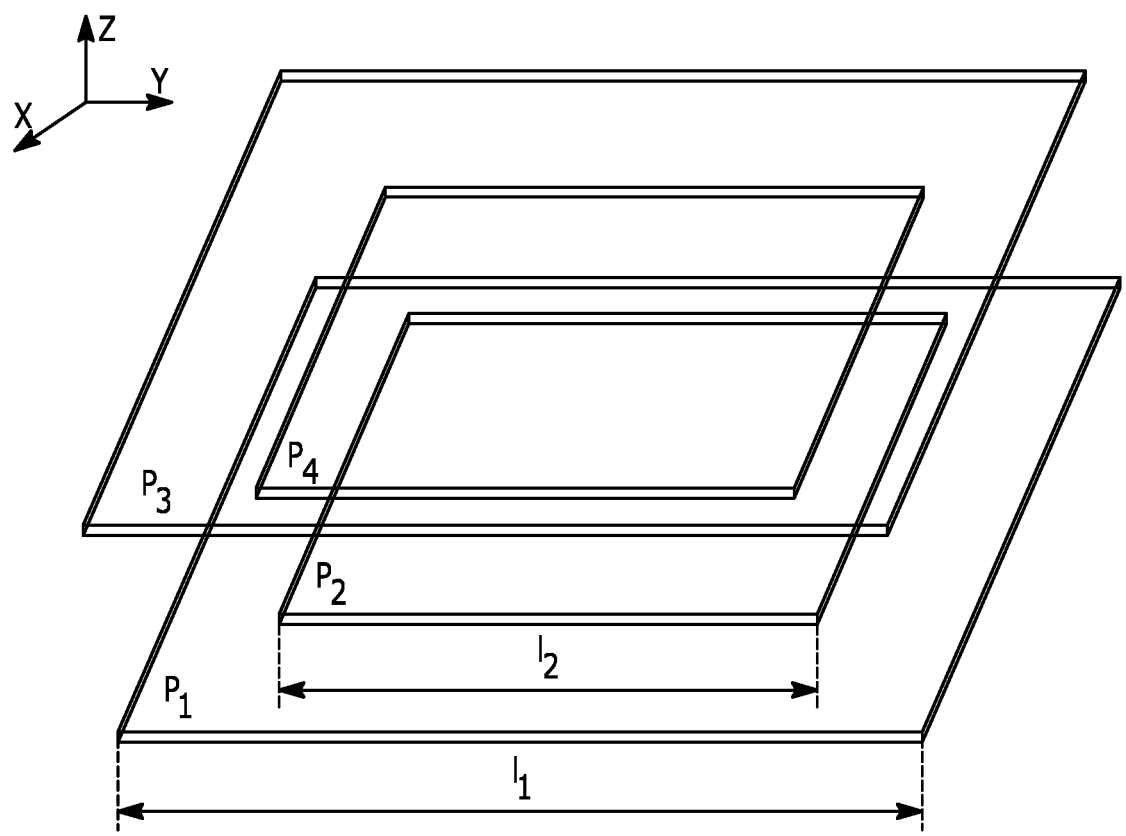

Embodiments described herein disclose a compact 4-plate structure for high power CPT applications. In this structure, all the plates are vertically arranged to save space, as shown in FIGS. 1(a) and 1(b). At each side, two plates are placed close to each other to maintain a large coupling capacitance, which is used to replace two external compensation capacitors in the LCLC topology. Therefore, the LCLC compensation topology can be simplified as the LCL topology. To transfer high power through the coupler, generating high voltage between the plates is required to build up electric fields. For each two plates at the same side, the coupling capacitance can be adjusted through regulating the distance. Then, the switching frequency and system power can be controlled. Since the distance can be reduced to maintain a large capacitance, the system frequency can be reduced to a reasonable range. Also, according to certain embodiments, the capacitance does not relate to the misalignment, so the system has good misalignment ability. The LCL topology can resonate with the plates to provide high voltage, and it performs as a constant current source for both the input and output, which is suitable for the battery load, for example, among other applications.

Plate Structure

FIGS. 1(a) and 1(b) illustrate the structure and dimensions of the plates. Both the 3-D view and front view are provided, respectively. The plates are designed to be symmetric from the primary to the secondary side, according to the depicted example; however, one of ordinary skill would realize that various alterations may be implemented within the scope of the present disclosure. P1 and P2 can be embedded on the ground (e.g., a roadway) as the power transmitter in one example. P3 and P4 are installed on the vehicle as the power receiver. In FIGS. 1(a) and 1(b), P1 and P3 are larger than P2 and P4. Therefore, the coupling between P1 and P3 cannot be eliminated by P2 and P4. The plate shape does not affect coupling, so all the plates are depicted to be square to simplify the analysis, in the present embodiment. One of ordinary skill in the art would realize, however, that various other shapes could be similarly implemented.

According to an exemplary embodiment, one principle may be to maintain the area of the plates to transfer sufficient power. The length of P1 and P3 is l1, the length of P2 and P3 is l2, the distance of P1-P2 and P3-P4 is $d_c$, and the distance of P2-P4 is d, which is the air gap between the primary and secondary side. The thickness of all the plates is the same in the depicted example, for simplicity.

For the horizontal structure, the rotary misalignment, which is the mismatch between the primary and secondary plates, can reduce the output power. However, in the depicted vertical structure, the rotation in the horizontal plane does not cause much mismatch, and the coupling capacitors remain nearly unchanged. Also, the asymmetric structure reduces the voltage stress on the large plate, compared to the small one.

Circuit Model of the Plates

Figure 2:
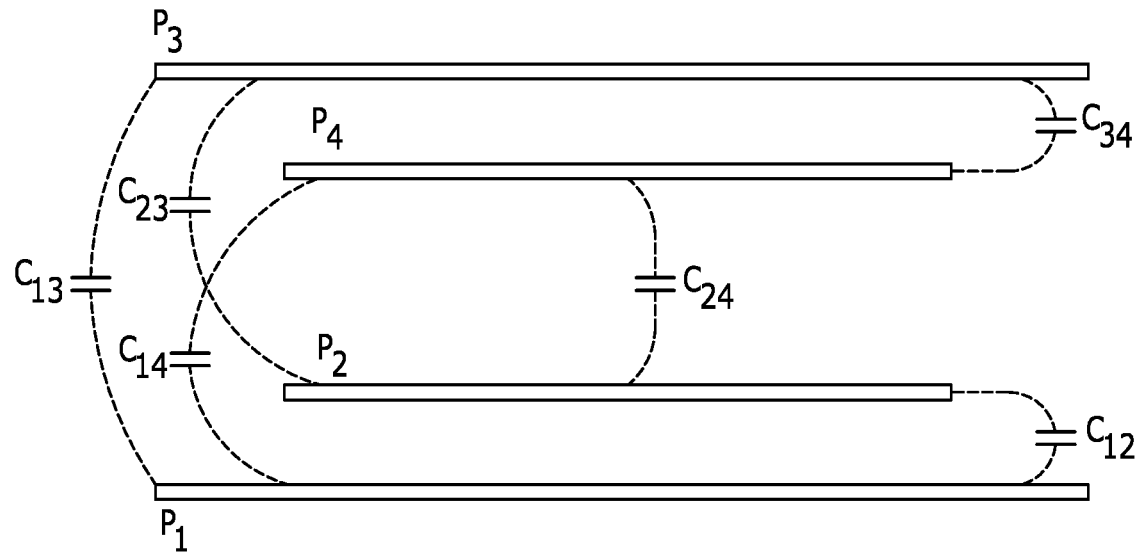
FIG. 2 illustrates exemplary coupling capacitances between plates of an exemplary capacitive coupler design, according to an exemplary embodiment.
Figure 3:
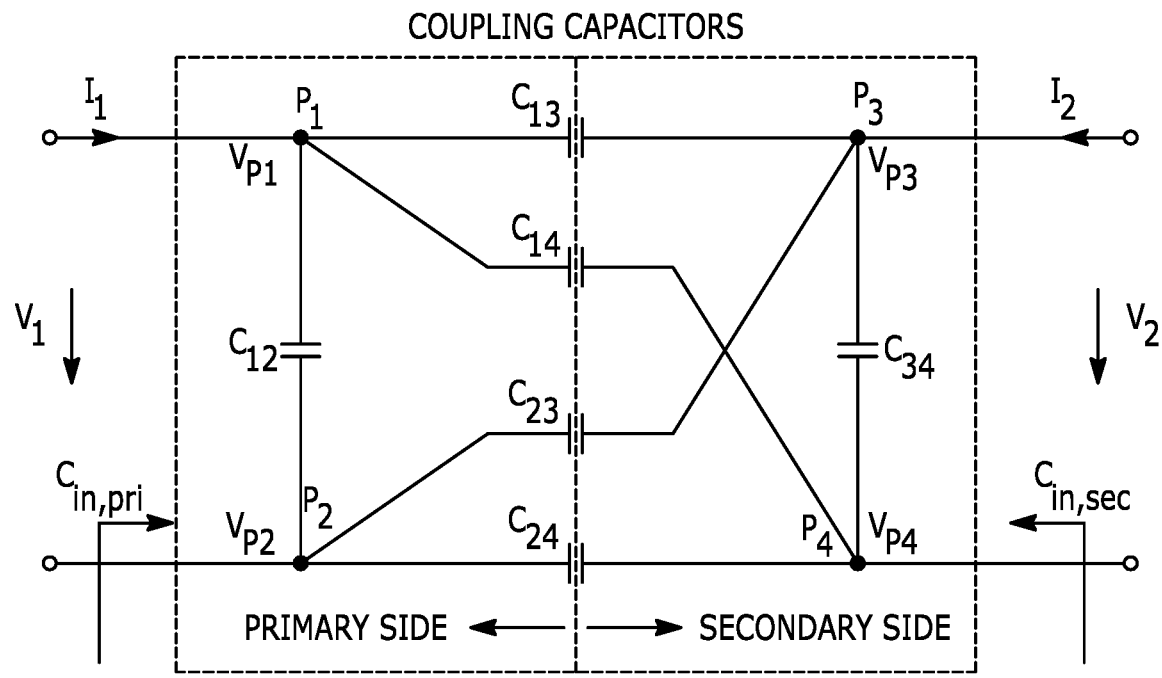
FIG. 3 illustrates an exemplary circuit model of a 4-plate vertical structure, according to an exemplary embodiment.

There is coupling capacitance between each two plates, as shown in FIG. 2. In this example, the air gap d is much larger than the plate distance $d_c$ in electric vehicle charging applications for example, so C13 and C24 are much smaller than C12 and C34. The cross-couplings of C14 and C23 are generated by the edge effect of P1-P4 and P2-P3, so they are usually smaller than C12 and C34. However, they should not be neglected in an accurate circuit model. The resulting circuit model of the 4-plate vertical structure is shown in FIG. 3. The equivalent input capacitances of the plates from the primary and secondary side are defined as $C_{in,pri}$ and $C_{in,sec}$, respectively, which are mainly determined by C12 and C34. Since C12 and C34 are mainly determined by the distance dc, and they do not relate to the misalignment between the primary and secondary side, so the resonance of this coupler is not sensitive to the misalignment.

In FIG. 3, two independent voltage sources $V_1$ and $V_2$ are applied on the plates to derive the relationship between the input and output. All the capacitors correspond to the couplings in FIG. 2. The voltage on each plate is defined as $V_{p1}$, $V_{p2}$, $V_{p3}$, and $V_{p4}$, respectively. Plate P2 is selected as the reference, so $V_{p2}=0$, $V_1=V_{p1}$, and $V_2=V_{p3}-V_{p4}$. Therefore, the Kirchhoff's current equations are expressed as:

$$\begin{cases} (C_{12}+C_{13}+C_{14}) \cdot V_{P1} - C_{13} \cdot V_{P3} - C_{14} \cdot V_{P4} = I_1/(j\omega) \\ -C_{12} \cdot V_{P1} - C_{23} \cdot V_{P3} - C_{24} \cdot V_{P4} = -I_1/(j\omega) \\ -C_{13} \cdot V_{P1} + (C_{13}+C_{23}+C_{34}) \cdot V_{P3} - C_{34} \cdot V_{P4} = I_2/(j\omega) \\ -C_{14} \cdot V_{P1} - C_{34} \cdot V_{P3} + (C_{14}+C_{24}+C_{34}) \cdot V_{P4} = -I_2/(j\omega) \end{cases} \quad (1)$$

where $I_1$ and $I_2$ are the current injected into the plates from the primary and secondary sides, respectively, $\omega=\pi f_{sw}$ and $f_{sw}$ is the frequency of the input and output ac sources.

The plates are modeled as a two-port network with $V_1$, $V_2$ as the input and $I_1$, $I_2$ as the output variables. There are four equations in (1), and any three of them are independent. The relationship between voltage and current can be derived from the equations in (1). Considering the first two equations in (1), $V_{P3}$ and $V_{P4}$ can be eliminated, as shown in (2).

$$\begin{cases} [C_{24}(C_{12}+C_{13}+C_{14})+C_{12}C_{14}] \cdot \\ V_{P1} - (C_{13}C_{24}-C_{14}C_{23}) \cdot V_{P3} = (C_{24}+C_{14})I_1/(j\omega) \\ [C_{23}(C_{12}+C_{13}+C_{14})+C_{12}C_{13}] \cdot \\ V_{P1} + (C_{13}C_{24}-C_{14}C_{23}) \cdot V_{P4} = (C_{23}+C_{13})I_1/(j\omega) \end{cases} \quad (2)$$

Since $V_1=V_{P1}$ and $V_2=V_{P3}-V_{P4}$, the relationship between $V_1$, $I_1$, and $V_2$ can be expressed as, $$V_1 = I_1 \cdot \frac{1}{j\omega\left[C_{12}+\frac{(C_{13}+C_{14}) \cdot (C_{23}+C_{24})}{C_{13}+C_{14}+C_{23}+C_{24}}\right]} + \quad (3)$$

$$V_2 \cdot \frac{C_{24}C_{13}-C_{14}C_{23}}{C_{12} \cdot (C_{13}+C_{14}+C_{23}+C_{24})+(C_{13}+C_{14}) \cdot (C_{23}+C_{24})}$$

Similarly, using the other two equations in (1), the relationship between $V_2$, $I_2$, and $V_1$ can be expressed as:

$$V_2 = I_2 \cdot \frac{1}{j\omega\left[C_{34}+\frac{(C_{13}+C_{23}) \cdot (C_{14}+C_{24})}{C_{13}+C_{14}+C_{23}+C_{24}}\right]} + \quad (4)$$

$$V_1 \cdot \frac{C_{24}C_{13}-C_{14}C_{23}}{C_{34} \cdot (C_{13}+C_{14}+C_{23}+C_{24})+(C_{13}+C_{23}) \cdot (C_{14}+C_{24})}$$

From (3) and (4), the capacitances $C_1$, $C_2$, and $C_M$ can be defined as:

$$\begin{cases} C_1 = C_{12} + \frac{(C_{13}+C_{14}) \cdot (C_{23}+C_{24})}{C_{13}+C_{14}+C_{23}+C_{24}} \\ C_2 = C_{34} + \frac{(C_{13}+C_{23}) \cdot (C_{14}+C_{24})}{C_{13}+C_{14}+C_{23}+C_{24}} \\ C_M = \frac{C_{24}C_{13}-C_{14}C_{23}}{C_{13}+C_{14}+C_{23}+C_{24}} \end{cases} \quad (5)$$

Therefore, (3) and (4) can be rewritten as:

$$\begin{cases} V_1 = I_1 \cdot \frac{1}{j\omega C_1} + V_2 \cdot \frac{C_M}{C_1} \\ V_2 = I_2 \cdot \frac{1}{j\omega C_2} + V_1 \cdot \frac{C_M}{C_2} \end{cases} \quad (6)$$

Move $I_1$ and $I_2$ to the left-hand side, and the relationship between the current and voltage is shown as (7).

$$\begin{cases} I_1 = j\omega C_1 \cdot V_1 - j\omega C_M \cdot V_2 \\ I_2 = j\omega C_2 \cdot V_2 - j\omega C_M \cdot V_1 \end{cases} \quad (7)$$

Figure 4A:
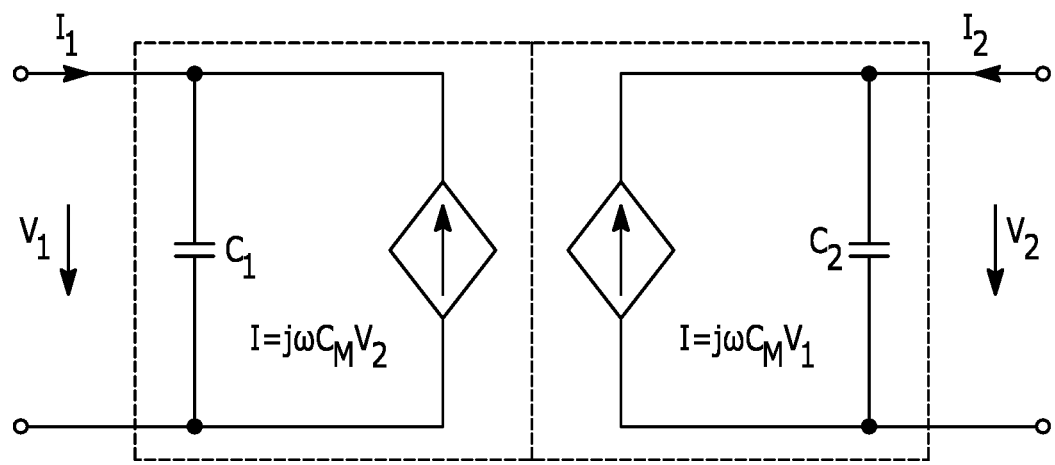
FIGS. 4(a) and 4(b) illustrate simplified circuit models of coupling capacitors, according to exemplary embodiments.

According to (7), the simplified equivalent model of coupling capacitors with behavior sources is shown in FIG. 4(a). Each of the two current sources depends on the voltage at the other side and they are separated by a dashed line.

Figure 4B:
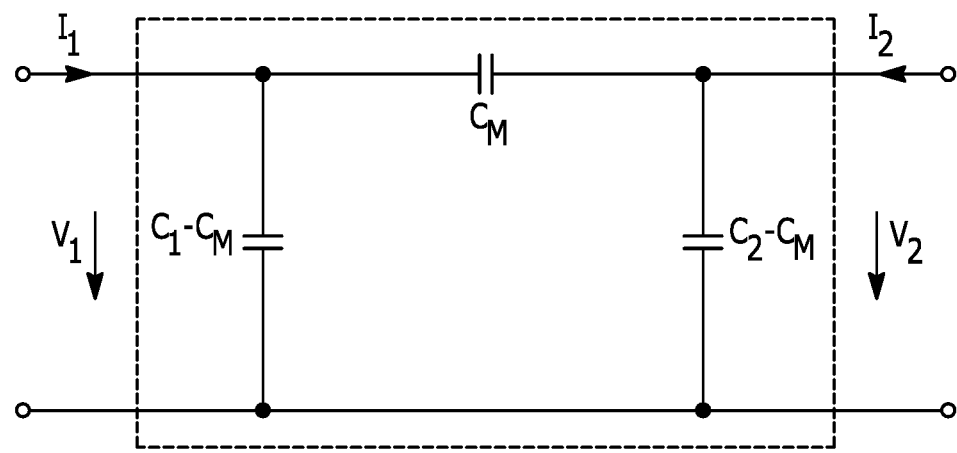

Equation (7) is further written as (8). Then, the equivalent model of the capacitors is simplified to a π shape, as shown in FIG. 4(b). This model is suitable to simplify the parameter calculation in the circuit. It needs to be emphasized that the primary and secondary sides are not separated in the π shape model.

$$\begin{cases} I_1 = j\omega(C_1-C_M) \cdot V_1 + j\omega C_M \cdot (V_1-V_2) \\ I_2 = j\omega(C_2-C_M) \cdot V_2 + j\omega C_M \cdot (V_2-V_1) \end{cases} \quad (8)$$

Similar to that of the coils, the capacitive coupling coefficient $k_c$ of the plates is defined with the parameters from (5), as shown in (9).

$$k_C = \frac{C_M}{\sqrt{C_1 \cdot C_2}} = \tag{9}$$

$$\frac{\sqrt{C_{24}C_{13} - C_{14}C_{23}}}{\sqrt{C_{12}(C_{13} + C_{14} + C_{23} + C_{24}) + (C_{13} + C_{14})(C_{23} + C_{24})}} \cdot$$

$$\frac{\sqrt{C_{24}C_{13} - C_{14}C_{23}}}{\sqrt{C_{34}(C_{13} + C_{14} + C_{23} + C_{24}) + (C_{13} + C_{23})(C_{14} + C_{24})}}$$

From the simplified model in FIGS. 4(*a*) and (*b*), the self-capacitance of the primary side is C1, the self-capacitance of the secondary side is C2, the mutual capacitance between the primary and secondary is $C_M$, and the capacitive coupling coefficient is kc.

For the vertical structure shown in FIG. 2, for example, the plate distance dc is much smaller than the air gap distance d, so C12 and C34 are much larger than C13 and C24. As a result, the capacitive coupling coefficient $k_c \ll 1$, which means it is a loosely-coupled CPT system, according to an embodiment.

Since the plates work as a single capacitor to resonate with the inductor in the circuit, it is important to calculate the equivalent input capacitances of the plates. FIG. 3 shows the capacitances $C_{in,pri}$ and $C_{in,sec}$ from the primary and secondary sides, respectively. It is convenient to use the simplified capacitor model in FIGS. 4(*a*) and 4(*b*) to perform the calculations. Therefore, the equivalent input capacitances are:

$$\begin{cases} C_{in,pri} = \frac{I_1}{j\omega \cdot V_1}\bigg|_{I_2=0} = C_1 - C_M + \frac{C_M(C_2 - C_M)}{C_2} = (1 - k_c^2)C_1 \\ C_{in,sec} = \frac{I_2}{j\omega \cdot V_2}\bigg|_{I_1=0} = C_2 - C_M + \frac{C_M(C_1 - C_M)}{C_1} = (1 - k_c^2)C_2 \end{cases} \tag{10}$$

The transfer function between the input and output voltage is also an important parameter to determine the amount of transferred power. The voltage transfer function from the primary to the secondary side is defined as $H_{1,2}$ and the voltage transfer function from the secondary to the primary is defined as $H_{2,1}$. They can be expressed as in (11).

$$\begin{cases} H_{1,2} = \frac{V_2}{V_1}\bigg|_{I_2=0} = \frac{C_M}{C_2} = k_c \sqrt{\frac{C_1}{C_2}} \\ H_{2,1} = \frac{V_1}{V_2}\bigg|_{I_1=0} = \frac{C_M}{C_1} = k_c \sqrt{\frac{C_2}{C_1}} \end{cases} \tag{11}$$

The plate model in FIGS. 4(*a*) and 4(*b*) includes the voltage stress between plates $P_1$ and $P_2$ and the stress between $P_3$ and $P_4$. However, it does not consider the voltage between $P_1$ and $P_3$, or the voltage between $P_2$ and $P_4$, which are also important in the system design. Since $P_2$ is set to be the reference, the second equation in (2) is used to calculate the voltage between $P_2$ and $P_4$, as shown in (12).

$$V_{P4-P2} = V_{P4} = \tag{12}$$

$$\frac{(C_{23} + C_{13}) \cdot I_1}{j\omega(C_{13}C_{24} - C_{23}C_{14})} - \frac{C_{12}(C_{13} + C_{23}) + C_{23}(C_{13} + C_{14})}{(C_{13}C_{24} - C_{23}C_{14})} \cdot V_1$$

Using equation (1), the voltage between $P_1$ and $P_3$ is expressed as (13).

$$V_{P1-P3} = V_{P1} - V_{P3} = \tag{13}$$

$$\frac{-(C_{23} + C_{24}) \cdot I_2}{j\omega(C_{13}C_{24} - C_{23}C_{14})} + \frac{C_{34}(C_{23} + C_{24}) + C_{23}(C_{14} + C_{24})}{(C_{13}C_{24} - C_{23}C_{14})} V_2$$

Exemplary Plate Dimensions Design

Using the circuit model of the plates, the dimensions of the plates can be determined for the electric vehicle charging application, as an exemplary embodiment. The purpose of dimension design is to calculate all the capacitances in (5) and analyze the behavior of the plates. Since the plate structure is designed to be symmetric from the primary to the secondary side, C is defined as C=C1=C2.

Considering the space limitation, the length l1 of P1 and P3 could be set to 914 mm, for example. The air gap can be set to be 150 mm, for example. Therefore, there are only two parameters, dc and l2, that need to be designed. The plate ratio $r_p$ is defined as $r_p = l2/l1$.

Since the cross coupling is usually small, it can be neglected at the beginning stage of plates design. The empirical formula of parallel plates can be used to estimate the capacitance based on the system dimensions to accelerate the design process. This estimation can provide a reasonable range of the dimensions. Then, the finite element analysis (FEA) by Maxwell can be used to accurately determine the final dimensions and the corresponding circuit model of the plates.

The FEA simulation provides a capacitance matrix with all the six mutual capacitors in FIG. 2. Using the capacitance matrix, the equivalent capacitances C and $C_M$ are further calculated according to (5), and the capacitive coupling coefficient are obtained from (9). When the plate ratio rp and distance dc vary, all the plate capacitances are analyzed in Maxwell. The equivalent parameters ($C_M$, C, and $k_C$) in the plate model are shown in FIGS. 5(*a*)-(*c*) as the function of $r_p$ and $d_c$.

Figure 5A:
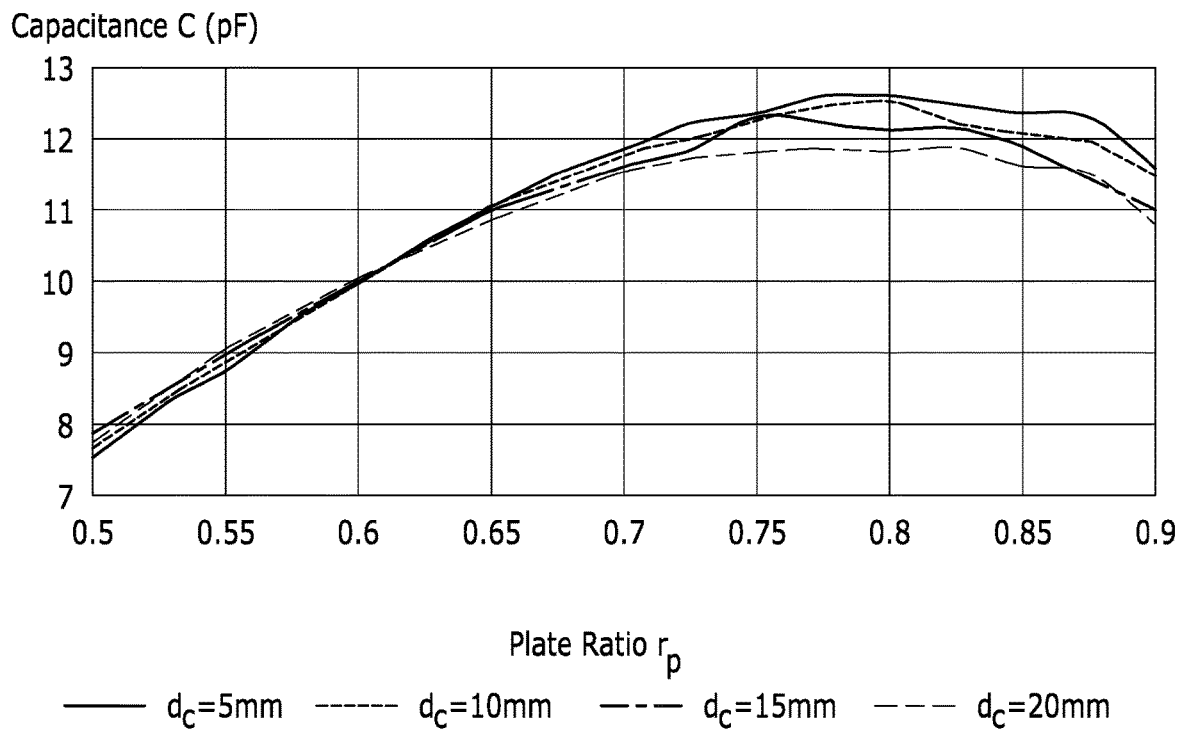
FIGS. 5(a), 5(b) and 5(c) illustrate graphical representations of various capacitances at various distances and the coupling coefficient, with respect to the plate ratio, according to various embodiments.
Figure 5B:
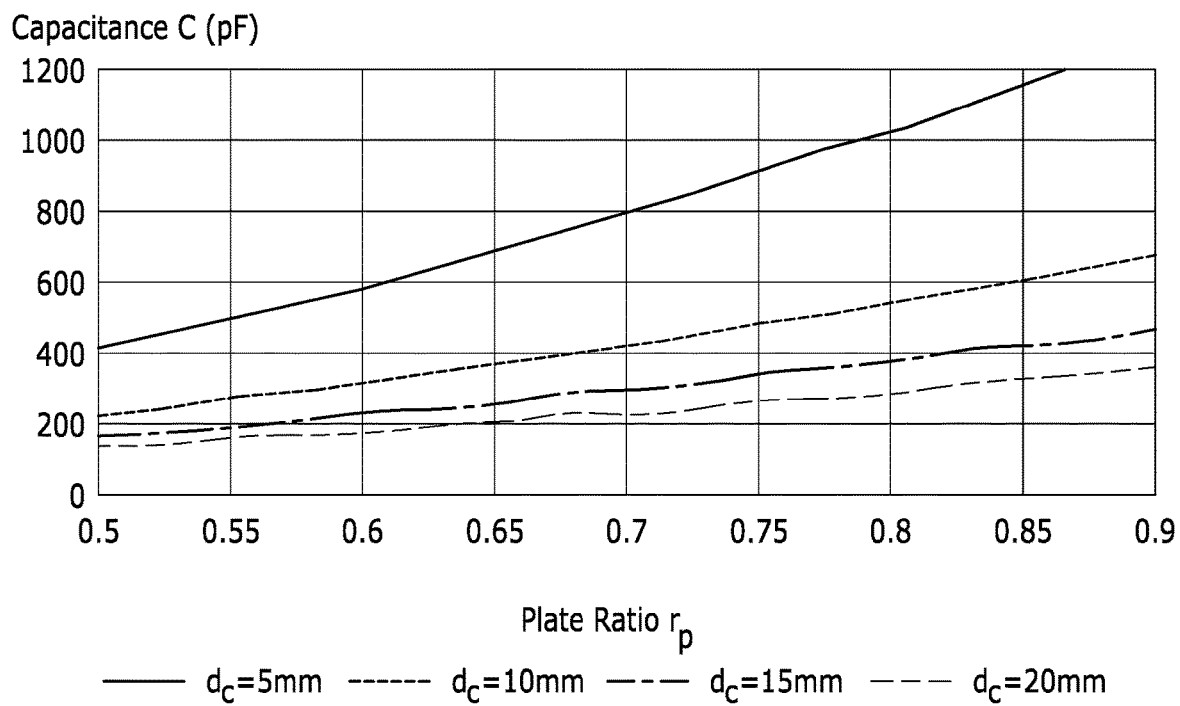
Figure 5C:
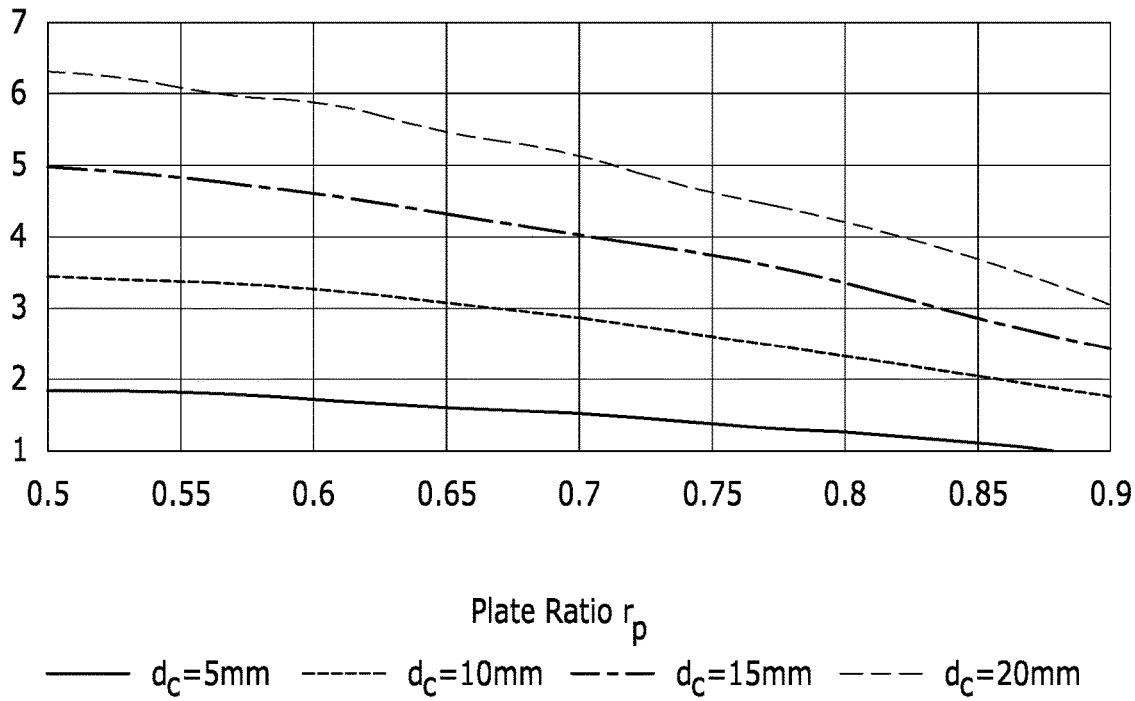

FIG. 5(*a*) shows that the mutual capacitance $C_M$ is only sensitive to the plate ratio rp. FIG. 5(*b*) shows that the increase of $r_p$ and the decrease of dc both cause the increase of the self-capacitance C. For the capacitive coupling coefficient $k_C$, FIG. 5(*c*) shows that it is smaller than 10%, which indicates that it is a loosely coupled CPT system.

According to certain embodiments, the self-capacitance should be large enough to reduce the inductor's value and volume. At the same time, the coupling coefficient should be large enough to maintain the system power as well. Therefore, considering FIGS. 5(*b*) and 5(*c*), the plate distance $d_c$ can be set to be 10 mm and the plate ratio $r_p$ is 0.667. All the capacitances for this exemplary scenario can be shown in Table I.

TABLE I

| Capacitance values of plates, When $l_1$ = 914 mm, $l_2$ = 610 mm, $d_c$ = 10 mm, d = 150 mm | | | |
|---|---|---|---|
| Parameter | Value | Parameter | Value |
| $C_{12}$ | 365.7 pF | $C_{34}$ | 365.7 pF |
| $C_{13}$ | 42.40 pF | $C_{24}$ | 19.52 pF |
| $C_{14}$ | 4.72 pF | $C_{23}$ | 4.72 pF |
| $C_1$ | 380.9 pF | $C_2$ | 380.9 pF |
| $C_M$ | 11.3 pF | $k_C$ | 2.90% |

Figure 6:
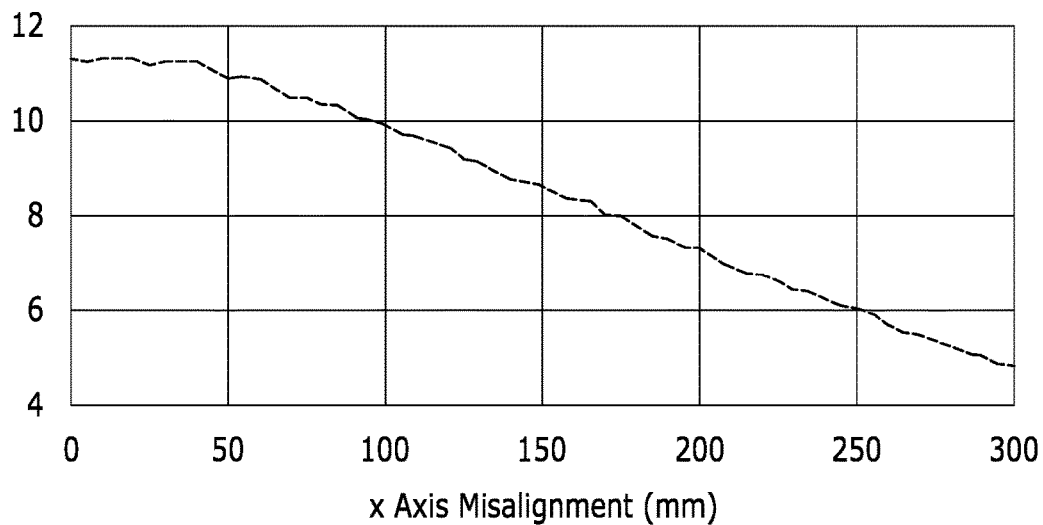
FIG. 6 illustrates a graphical representation of capacitance with respect to x-axis misalignment, according to an exemplary embodiment.

The misalignment ability of the plates is also analyzed in Maxwell. When there is a rotation of the secondary plates in the horizontal plane as shown in FIGS. 1(a) and 1(b), the variation of self-capacitance C1,2 is within 1% of the well-aligned value and the variation of mutual capacitance $C_M$ is within 10%. When there is displacement misalignment, the variation of self-capacitance is negligible, and the variation of mutual inductance is shown in FIG. 6, according to one example. The X axis is as defined in FIGS. 1(a) and 1(b) above. This figure shows that CM can maintain higher than 50% of the nominal value when the misalignment increases to 250 mm, according to one example.

Double-Sided LCL Compensation Topology

Figure 7:
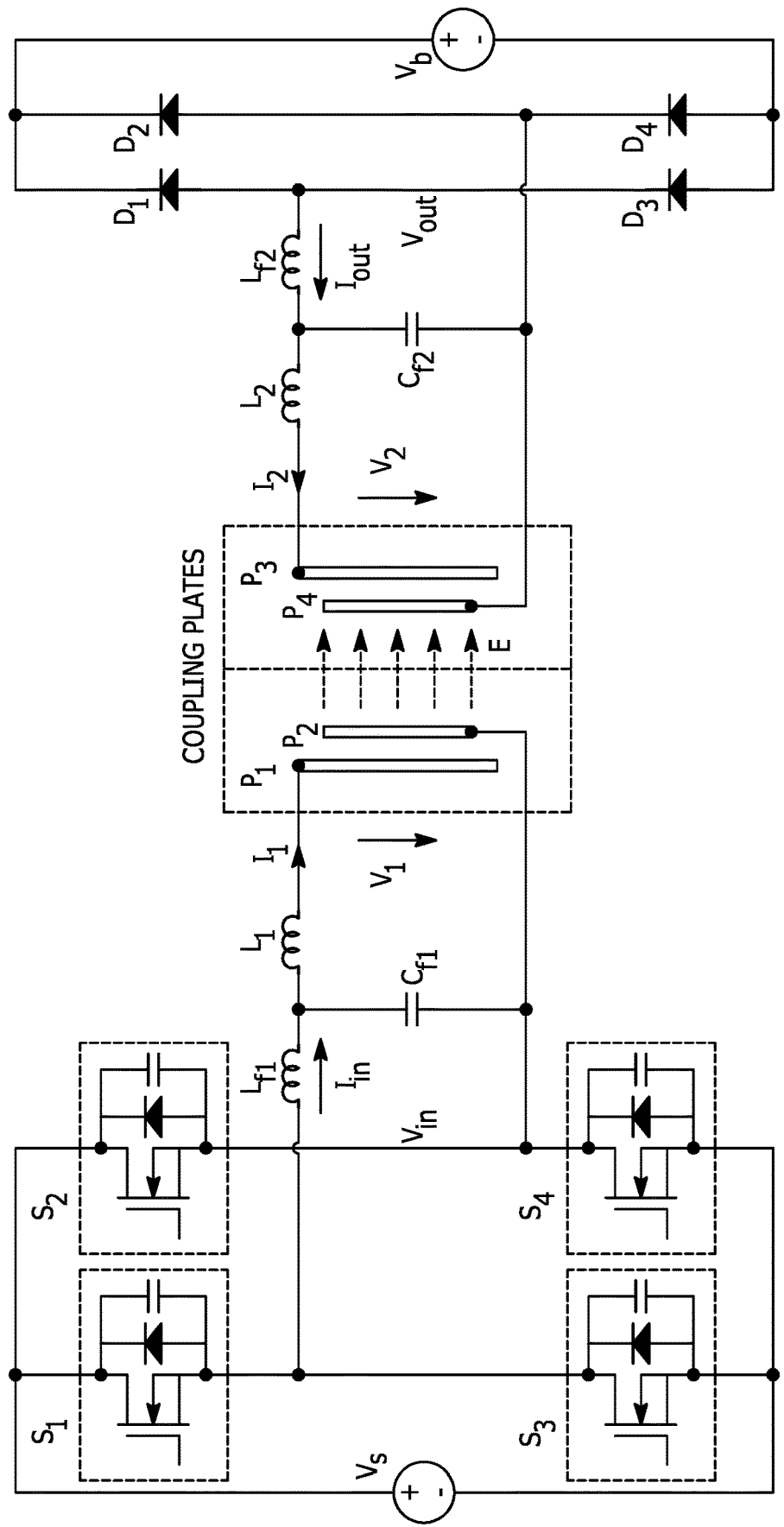
FIG. 7 illustrates an exemplary double-sided LCL compensation circuit, according to an exemplary embodiment.

A double-sided LCL compensation circuit may be implemented to work with the plates, as shown in FIG. 7, according to an exemplary embodiment. The plates are in the vertical structure as shown in FIG. 2. There are multiple resonances in the circuit. At the primary side, there is a full-bridge inverter, generating excitation $V_{in}$ to the resonant tank. At the secondary side, a full-bridge rectifier is used to provide dc current to the output battery. In FIG. 7, all the components can be assumed to have high quality factor in one example, and the parasitic resistances are neglected in the analysis process.

Figure 8A:
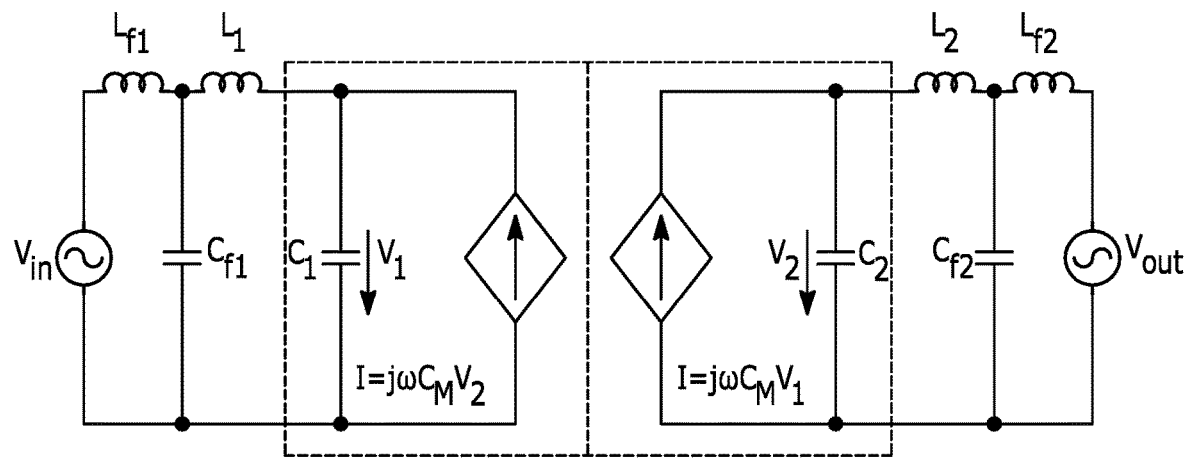
FIG. 8(a) illustrates a simplified circuit topology of a CPT system, according to an exemplary embodiment.

In one embodiment, $L_{f1}$ and $C_{f1}$ work as a low-pass filter at the front end. Similarly, $L_{f2}$ and $C_{f2}$ work as a low-pass filter at the back end. Therefore, there is no high-order harmonics current injected into the plates. The fundamental harmonics approximation (FHA) method is used to analyze the working principle of the system. FIG. 8(a) shows the simplified circuit topology of the CPT system with the equivalent circuit model of the plates in FIG. 4(a). The input and output square-wave sources are represented by two sinusoidal ac sources. Since the circuit in FIG. 8(a) is linear, the superposition theorem is used to analyze the two ac sources separately, as shown in FIGS. 8(b) and 8(c).

Figure 8B:
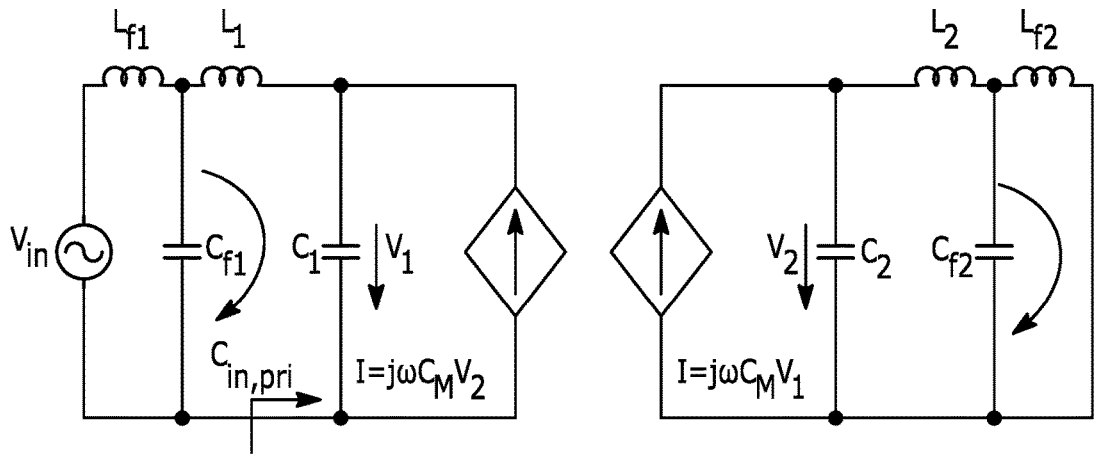
FIG. 8(b) illustrates an example where a resonant circuit is excited only by a primary source, according to an exemplary embodiment.
Figure 8C:
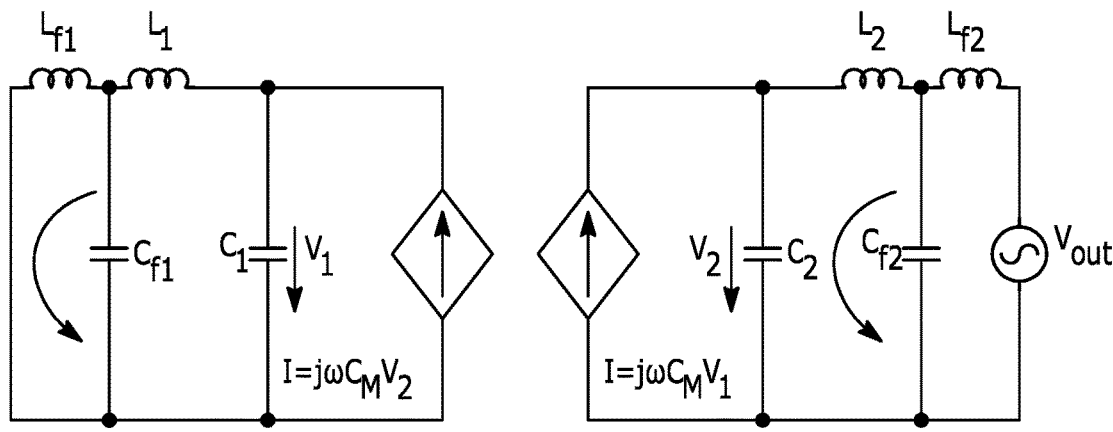
FIG. 8(c) illustrates an exemplar where a resonant circuit is excited only by a secondary source, according to an exemplary embodiment.

FIG. 8(b) shows that the resonant circuit is excited only by the primary source. $L_{f2}$ and $C_{f2}$ form a parallel resonance, and their impedance is infinite. $L_2$ is treated as open circuit. $L_1$, $C_{f1}$, and $C_{in,pri}$ form another parallel resonance, so there is no current flowing through $L_{f1}$, which means the input current does not rely on the input voltage $V_{in}$. Therefore, the relationship between the circuit parameters is:

$$\begin{cases} \omega = 2\pi f_{sw} = 1 / \sqrt{L_{f2} C_{f2}} \\ L_1 = 1/(\omega^2 C_{f1}) + 1/(\omega^2 C_{in,pri}) \end{cases} \quad (14)$$

The output current depends on the input voltage. Since $L_{f1}$ and $L_2$ are treated as open circuit, $V_{Cf1}=V_{in}$, $V_{Cf2}=V_2$. The transfer function between the primary and secondary voltages in (11) is used to calculate the voltage and current. Therefore, the output current is calculated in (15).

$$\begin{cases} V_1 = V_{Cf1} \cdot \dfrac{C_{f1}}{C_{in,pri}} = V_{in} \cdot \dfrac{C_{f1}}{(1-k_C^2)C_1} \\ V_2 = H_{1,2} \cdot V_1 = \dfrac{C_M \cdot C_{f1} \cdot V_{in}}{(1-k_C^2) \cdot C_1 C_2} \\ I_{Lf2} = V_2 \cdot \dfrac{1}{j\omega L_{f2}} = V_2 \cdot \dfrac{\omega \cdot C_{f2}}{j} = \dfrac{\omega \cdot C_M \cdot C_{f1} C_{f2} \cdot V_{in}}{j(1-k_C^2) \cdot C_1 C_2} \end{cases} \quad (15)$$

There can be a full-brige rectifier at the secondary side, so the output voltage and current are in phase. FIG. 8(c) indicates that the output voltage does not affect the output current. Therefore, the output power can be expressed as:

$$P_{out} = |V_{out}| \cdot |I_{Lf2}| = \dfrac{\omega \cdot C_M \cdot C_{f1} C_{f2}}{(1-k_C^2) \cdot C_1 C_2} \cdot |V_{in}| \cdot |V_{out}| \quad (16)$$

FIG. 8(c) shows that the resonant circuit is excited only by the secondary source. Similar to the analysis of FIG. 8(b), there are two parallel resonances. $L_{f1}$ and $C_{f1}$ form one resonance, and $L_2$, $C_{f2}$, and $C_{in,sec}$ form the other resonance. Because of the infinite impendance of the parallel resonance, $L_1$ and $L_{f2}$ are treated as open circuit. The input current only depends on the output voltage. Therefore, the relationship between the circuit parameters is:

$$\begin{cases} \omega = 2\pi f_{sw} = 1 / \sqrt{L_{f1} C_{f1}} \\ L_2 = 1/(\omega^2 C_{f2}) + 1/(\omega^2 C_{in,sec}) \end{cases} \quad (17)$$

The input current depends on the output voltage. Since $L_1$ and $L_{f2}$ are open circuit, then $V_{Cf1}=V_1$, $V_{Cf2}=V_{out}$. Considering the equivalent capacitance $C_{in,sec}$ in (10) and the voltage transfer function $H_{2,1}$ in (11), the input current can be calculated as:

$$\begin{cases} V_2 = V_{Cf2} \cdot \dfrac{C_{f2}}{C_{in,sec}} = V_{out} \cdot \dfrac{C_{f2}}{(1-k_C^2)C_2} \\ V_1 = H_{2,1} \cdot V_2 = \dfrac{C_M \cdot C_{f2} \cdot V_{out}}{(1-k_C^2) \cdot C_1 C_2} \\ I_{Lf1} = V_1 \cdot \dfrac{1}{j\omega L_{f1}} = V_1 \cdot \dfrac{\omega \cdot C_{f1}}{j} = \dfrac{\omega \cdot C_M \cdot C_{f1} C_{f2} \cdot V_{out}}{j(1-k_C^2) \cdot C_1 C_2} \end{cases} \quad (18)$$

Equation (18) shows that $I_{Lf1}$ is 90° lagging $V_{out}$, and (15) shows that $I_{Lf2}$ is 90° lagging $V_{in}$. Since $V_{out}$ and $I_{Lf2}$ are in phase, $I_{LF1}$ is 180° lagging $V_{in}$. The input current direction is opposite to that of $I_{Lf1}$, so it is in phase with $V_{in}$. Therefore, the input power is expressed as:

$$P_{in} = |V_{in}| \cdot |-I_{Lf1}| = \dfrac{\omega \cdot C_M \cdot C_{f1} C_{f2}}{(1-k_C^2) \cdot C_1 C_2} \cdot |V_{in}| \cdot |V_{out}| \quad (19)$$

A comparison of (16) and (19) shows that when the parasitic resistances are neglected, the input and output power are the same, which also supports the previous assumption.

Equation (19) shows that the system power is propotional to the mutual capacitance $C_M$, the filter capacitances $C_{f1,2}$, the voltage $V_{in}$ and $V_{out}$, and the switching frequency $f_{sw}$. According to the plate design in Section II, the capacitive coupling coefficient $k_C$ is usually much smaller than 10%, so $(1-k_C^2) \approx 1$. Therefore, the system power can be simplified as:

$$P_{in} = P_{out} \approx \dfrac{\omega \cdot C_M \cdot C_{f1} C_{f2}}{C_1 C_2} \cdot |V_{in}| \cdot |V_{out}| \quad (20)$$

Considering the input dc voltage $V_s$ and the output battery voltage $V_b$ in FIG. 7, (20) can be rewritten:

$$P_{in} = P_{out} \approx \frac{\omega \cdot C_M \cdot C_{f1} C_{f2}}{C_1 C_2} \cdot \frac{2\sqrt{2}}{\pi} V_s \cdot \frac{2\sqrt{2}}{\pi} V_b \quad (21)$$

In the high power CPT system, the voltage stress on the circuit component, especially the metal plates, is an important concern. The voltage on inductors $L_{f1,2}$, $L_{1,2}$ and capacitors $C_{f1,2}$ can be calculated using the current flowing through them. The voltage between each two plates can be calculated according to (12), (13), (15), and (18), which are shown in exemplary Table II.

TABLE II

Voltage stress on circuit components

| Component | Voltage Stress |
|---|---|
| $L_{f1}$, $L_{f2}$ | $V_{Lf1} = \frac{C_M \cdot C_{f2} \cdot V_{out}}{(1-k_C^2) \cdot C_1 C_2}$, $V_{Lf2} = \frac{C_M \cdot C_{f1} \cdot V_{in}}{(1-k_C^2) \cdot C_1 C_2}$ |
| $C_{f1}$, $C_{f2}$ | $V_{Cf1} = V_{in} + V_{Lf1}$, $V_{Cf2} = V_{out} + V_{Lf2}$ |
| $L_1$, $L_2$ | $V_{L1} = \omega^2 L_1 C_{f1} \cdot V_{in}$, $V_{L2} = \omega^2 L_2 C_{f2} \cdot V_{out}$ |
| $P_1$-$P_2$ | $V_{P1\text{-}P2} = \frac{C_{f1} \cdot V_{in}}{(1-k_C^2) \cdot C_1} + \frac{C_M C_{f2} \cdot V_{out}}{(1-k_C^2) \cdot C_1 C_2}$ |
| $P_3$-$P_4$ | $V_{P3\text{-}P4} = \frac{C_M C_{f1} \cdot V_{in}}{(1-k_C^2) \cdot C_1 C_2} + \frac{C_{f2} \cdot V_{out}}{(1-k_C^2) \cdot C_2}$ |
| $P_1$-$P_3$ | $\frac{C_{34}(C_{23}+C_{24})+C_{23}(C_{14}+C_{24})}{(C_{13}C_{24}-C_{23}C_{14})}V_{P3\text{-}P4} - \frac{(C_{23}+C_{24})C_{f2}V_{out}}{(C_{13}C_{24}-C_{23}C_{14})}$ |
| $P_2$-$P_4$ | $\frac{(C_{23}+C_{13})C_{f1}V_{in}}{(C_{13}C_{24}-C_{23}C_{14})} - \frac{C_{12}(C_{13}+C_{23})+C_{23}(C_{13}+C_{14})}{(C_{13}C_{24}-C_{23}C_{14})}V_{P1\text{-}P2}$ |

In accordance with one exemplary design, according to equations (14), (17), and (19), all the circuit parameters can be designed, for exemplary purposes, as shown in Table III.

TABLE III

System specifications and circuit parameter values

| Parameter | Design Value | Parameter | Design Value |
|---|---|---|---|
| $V_{in}$ | 270 V | $V_{out}$ | 270 V |
| $l_1$ | 914 mm | $l_2$ | 610 mm |
| $d_c$ | 10 mm | $r_p$ | 0.667 |
| $f_{sw}$ | 1 MHz | $C_M$ | 11.3 pF |
| $L_{f1}$ | 2.90 μH | $L_{f2}$ | 2.90 μH |
| $C_{f1}$ | 8.73 nF | $C_{f2}$ | 8.73 nF |
| $L_1$ | 69.4 μH | $L_2$ | 70.0 μH |
| $C_1$ | 380.9 pF | $C_2$ | 380.9 pF |

Because of the symmetry of the plate structure, the other circuit parameters can also be designed to be symmetric. Considering the limitation of the semiconductor devices, the switching frequency can be 1 MHz. Further, $L_2$ can be larger than $L_1$ to provide soft-switching condition to the input inverter.

The power transfer density is also an important specification to evaluate the CPT system. For the LCL-compensated system, its power transfer density can be calculated as, $$P_{D,LCL} = \frac{P_{out}}{l_1^2} = \frac{1.88 \text{ kW}}{0.914^2 \text{ m}^2} 2.25 \text{ kW/m}^2 \quad (22)$$

For an exemplary LCLC-compensated system, for example, the space between the two pairs of plates should be considered, so its power transfer density is calculated as, $$P_{D,LCLC} = \frac{P_{out}}{l \cdot (2l + d_1)} = \frac{2.4 \text{ kW}}{0.61 \cdot (2 \times 0.61 + 0.5)\text{m}^3} = 2.29 \text{ kW/m}^2 \quad (23)$$

The power transfer density of the inductive power transfer system can also be compared. For exemplary LCC compensated IPT systems, power transfer density is calculated as, $$P_{D,IPT} = \frac{P_{out}}{l_1 \cdot l_2 \cdot d} = \frac{5.7 \text{ kW}}{0.6 \cdot 0.80 \text{ m}^2} = 11.88 \text{ kW/m}^2 \quad (24)$$

As a result, it shows that the power transfer density of these two CPT systems is comparable, and the IPT system has much higher power transfer density than the CPT system.

Alternative Embodiment

Figure 9:
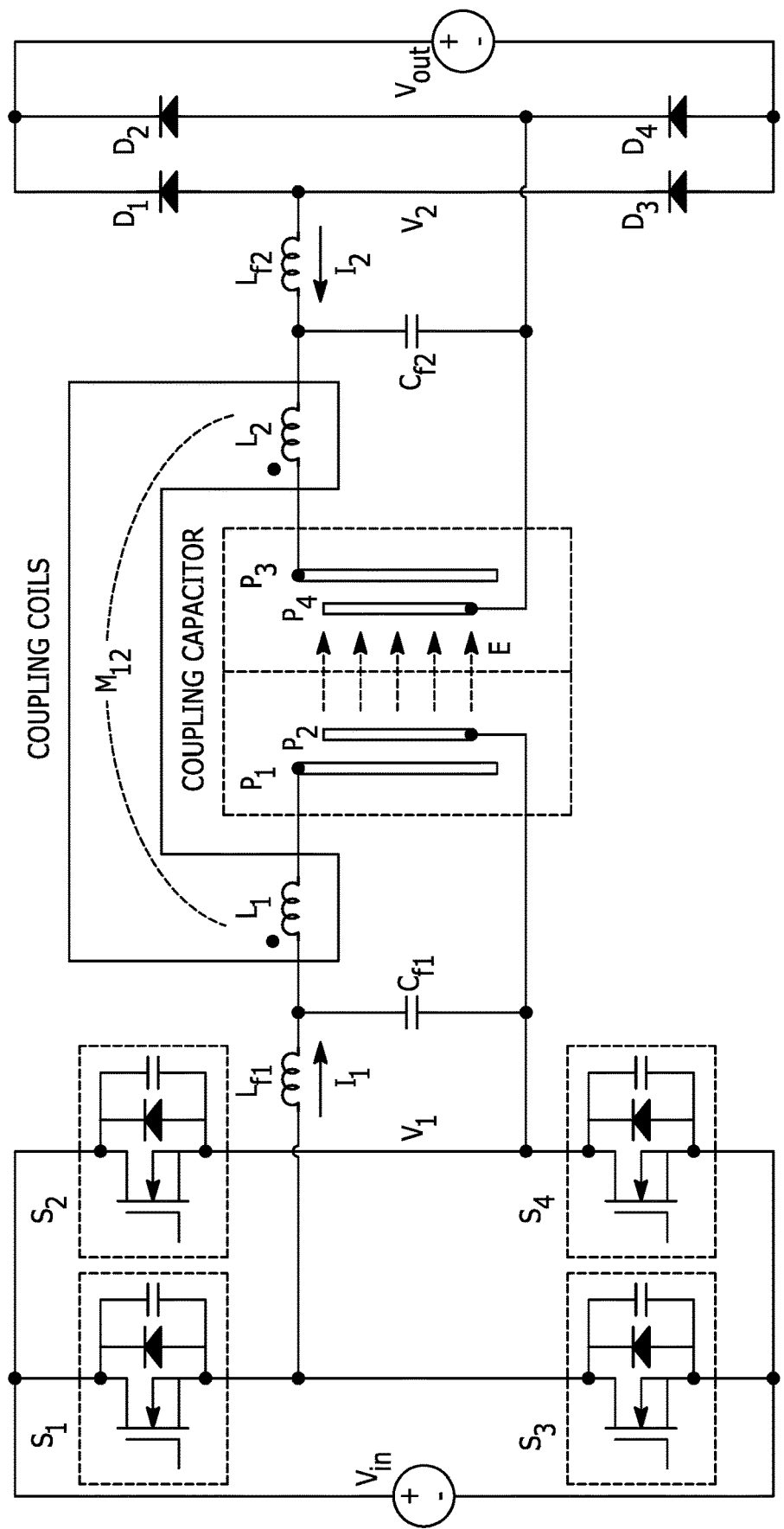
FIG. 9 illustrates an exemplary IPT-CPT system topology, according to an exemplary embodiment.

According to one embodiment, a corresponding IPT-CPT system topology is described and can be shown as in FIG. 9. The primary and secondary sides are separated by a dashed line. It is similar to the system described above, except that two of the inductors $L_1$ and $L_2$ are coupled to transfer power from the primary side to the secondary side using magnetic fields. At each side, there are only two external components connected to the coupling coils and capacitors, in this exemplary embodiment, according to the depicted example.

It is important to note the coupling polarity of $L_1$ and $L_2$. The connection in FIG. 9 can result in an addition of the inductive power with the capacitive power. If the coupling polarity is reversed, the two types of power transfer will cancel.

An H-bridge MOSFET inverter can be used at the input side and an H-bridge diode rectifier can be connected at the output side to the load. Silicon carbide (SiC) MOSFETs (C2M0080120D), for example, can be used in the inverter. The circuit in FIG. 9 can be tuned to provide soft-switching conditions to the inverter to mitigate the switching losses. In the rectifier, SiC diodes (IDW30G65C5), for example, can be applied.

Figure 10A:
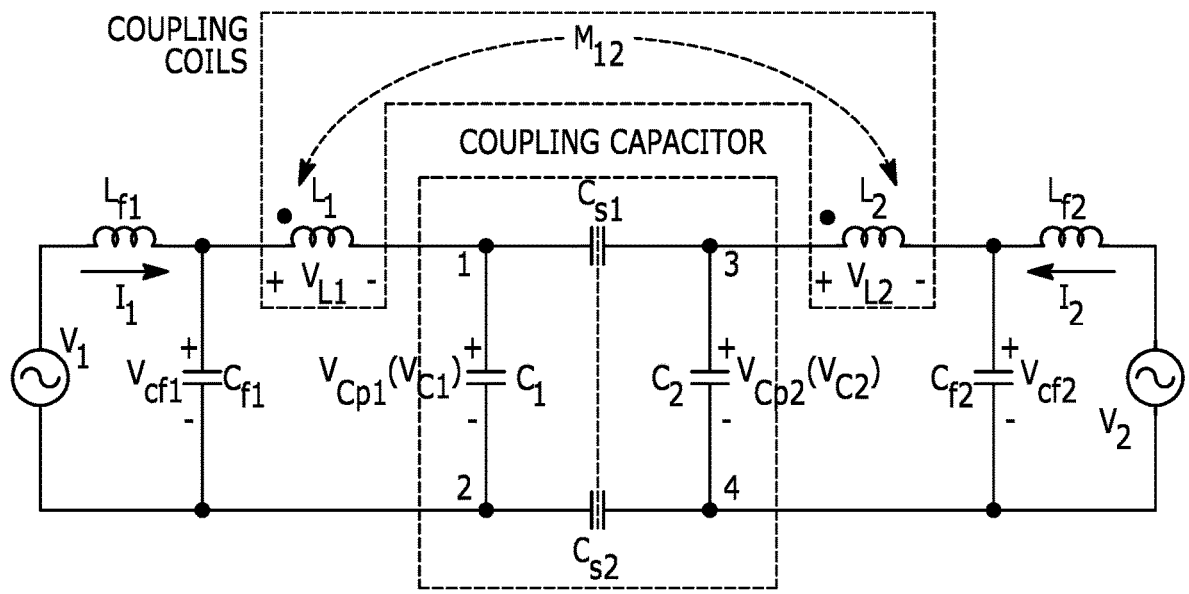
FIG. 10(a) illustrates an exemplary simplified resonant circuit topology of a IPT-CPT system, according to an exemplary embodiment.

The input-side inverter can generate a square-wave voltage excitation, and can inject power into the resonant tank. The output-side rectifier converts the output ac current into dc form and supplies the battery (not shown). Therefore, both the input and output voltage can include high-order harmonic components. However, the LC compensation network serves as low pass filter, therefore, the fundamental harmonics approximation (FHA) can be used to analyze a working principle, as shown in FIGS. 10(a)-10(c).

Figure 10B:
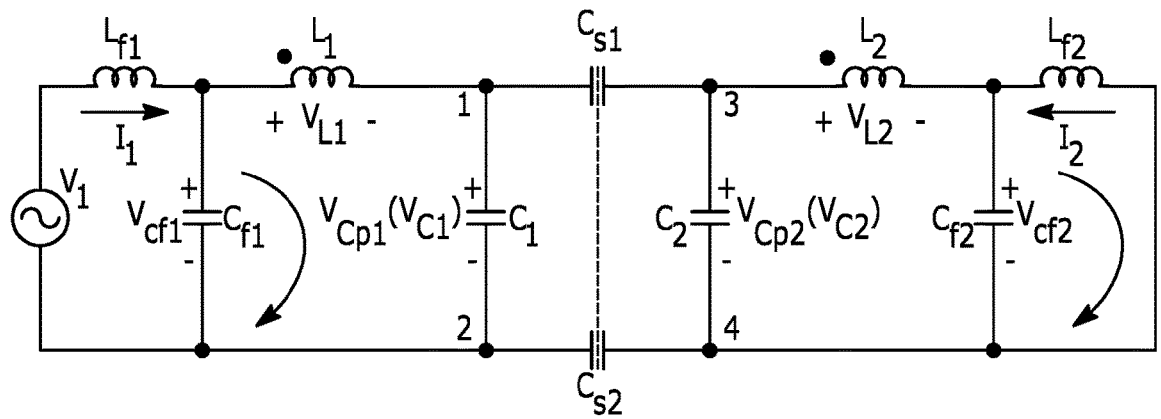
FIG. 10(b) illustrates an example circuit topology, as shown in FIG. 10(a), where the components are excited only by the input voltage source, according to an exemplary embodiment.
Figure 10C:
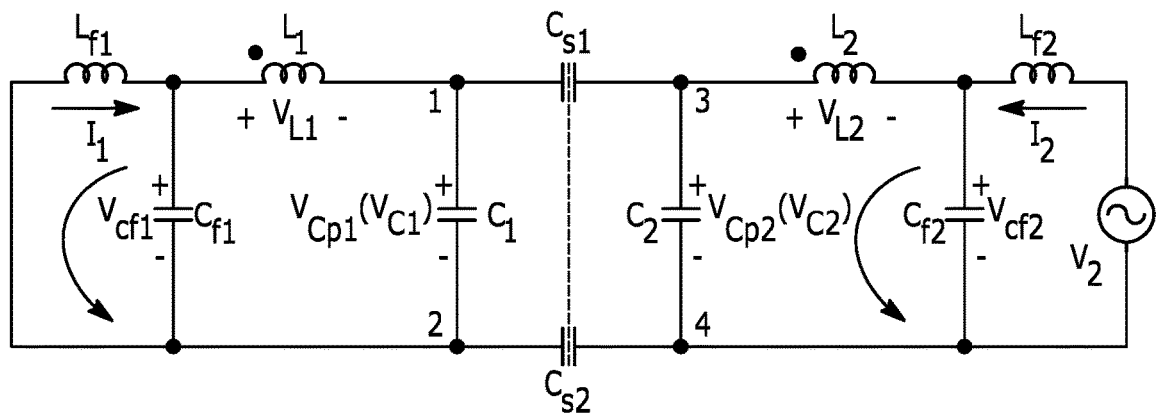
FIG. 10(c) illustrates an example circuit topology, as shown in FIG. 10(a), where the components are excited only by the output voltage source, according to an exemplary embodiment.

FIG. 10 (a) shows the simplified resonant circuit topology of FIG. 9. The coupling capacitor can replaced by the equivalent circuit model, at least in part, in FIG. 3, as described above. The input and output can be replaced by two sinusoidal voltage sources. The superposition theorem can be used to divide the two-source circuit into two single-source linear circuits, as shown in FIGS. 10(b) and 10(c), respectively.

FIG. 10(*b*) shows the components excited only by the input voltage source at the design frequency. There are two parallel resonances highlighted in FIG. 10(*b*). The components in greyscale conduct no current, so they can be treated as an open circuit.

The circuit in FIG. 10(*b*) results in the following equations, $$\begin{cases} \omega = 2\pi \cdot f_{sw} \\ C_s = \dfrac{1}{1/C_{s1} + 1/C_{s2}} \\ C_{p1} = C_1 + \dfrac{1}{1/C_s + 1/C_2} \\ \omega = 1 / \sqrt{L_{f2} \cdot C_{f2}} \\ \omega = 1 / \sqrt{L_1 \cdot \dfrac{1}{1/C_{p1} + 1/C_{f1}}} \end{cases} \quad (25)$$

where the switching frequency is $f_{sw}$, and $C_{p1}$ is the input capacitance of the coupling capacitor from the primary side. Equation (25) shows that $L_{f2}$ and $C_{f2}$ form a parallel resonance, and the impedance is infinite. There is no current flow through the inductor $L_2$. Also, $L_1$, $C_{f1}$ and $C_{p1}$ form another parallel resonance. There is no current flow through the inductor $L_{f1}$. The current on $L_{f1}$ is also the input current to the resonant tank. So, the input current is independent of the input voltage, which means the circuit can work as a current source to the input.

FIG. 10(*c*) shows the components excited only by the output voltage source at the desired frequency. There are two parallel resonances depicted in FIG. 10(*c*). The relationship between components is expressed as:

$$\begin{cases} C_{p2} = C_2 + \dfrac{1}{1/C_s + 1/C_1} \\ \omega = 1 / \sqrt{L_{f1} \cdot C_{f1}} \\ \omega = 1 / \sqrt{L_2 \cdot \dfrac{1}{1/C_{p2} + 1/C_{f2}}} \end{cases} \quad (26)$$

where $C_{p2}$ is the input capacitance of the coupling capacitor from the secondary side. Equation (26) shows that $L_{f1}$ and $C_{f1}$ form a parallel resonance. $L_2$, $C_{f2}$ and $C_{p2}$ form another parallel resonance. There is no current flow through inductors $L_1$ and $L_{f2}$. The current on $L_{f2}$ is also the output current to the load. The output current is therefore independent of the output voltage, and the resonant circuit works as a current source to the output.

System Power Calculation

First, the circuit in FIG. 10(*b*) can be used to calculate the output current and output power. It needs to be emphasized again that the output current only depends on the input voltage, as shown in FIG. 10(*b*). The input voltage $V_1$ is set to be the reference phasor in the following analysis.

The parallel resonance of $L_{f1}$, $C_{f1}$ and $C_{p1}$ is considered, so the voltage on each component can be expressed as below.

$$\begin{cases} V_{Cf1} = V_1 \\ V_{L1} = \dfrac{j\omega L_1 \cdot V_1}{j\omega L_1 + 1/(j\omega C_{p1})} = \dfrac{j\omega L_1 \cdot V_1}{-1/(j\omega C_{f1})} = \omega^2 L_1 C_{f1} V_1 \\ V_{Cp1} = \dfrac{1/(j\omega C_{p1}) \cdot V_1}{j\omega L_1 + 1/(j\omega C_{p1})} = \dfrac{1/(j\omega C_{p1}) \cdot V_1}{-1/(j\omega C_{f1})} = \dfrac{-C_{f1}}{C_{p1}} V_1 \end{cases} \quad (27)$$

The voltage on $C_{p1}$ is also the voltage on the capacitor $C_1$. So the voltage on $C_2$ can be expressed as:

$$V_{c2} = \dfrac{1/C_2}{1/C_s + 1/C_2} \cdot V_{C1} = \dfrac{1/C_2}{1/C_s + 1/C_2} \cdot \dfrac{-C_{f1}}{C_{p1}} \cdot V_1 \quad (28)$$

Considering the expression (25), the voltage on $C_2$ can be further simplified as:

$$V_{c2} = \dfrac{-C_s \cdot C_{f1}}{C_1 C_s + C_2 C_s + C_1 C_2} \cdot V_1 \quad (29)$$

Since $L_1$ and $L_2$ are magnetically coupled and there is current flow through $L_1$, there is also a voltage difference between the two terminals of $L_2$. The dot end connection in FIG. 10(*b*) determines the direction of this voltage. So the voltage on $L_2$ can be expressed as:

$$V_{L2} = \dfrac{M_{12}}{L_1} \cdot V_{L1} = \omega^2 M_{12} C_{f1} V_1, \quad (30)$$

$M_{12}$ is the mutual inductance, which is written as, $$M_{12} = k\sqrt{L_1 \cdot L_2}, \quad (31)$$

where k is the coupling coefficient. With the expression of (29) and (30), the voltage on $C_{f2}$ can be expressed as:

$$V_{Cf2} = V_{C2} - V_{L2} = \dfrac{-C_s \cdot C_{f1} \cdot V_1}{C_1 C_s + C_2 C_s + C_1 C_2} - \omega^2 M_{12} C_{f1} V_1 \quad (32)$$

Equation (32) indicates that the polarity connection of $L_2$ has to be the same as shown in FIG. 10(*b*). Otherwise, the voltage $V_{C2}$ and $V_{L2}$ will be cancelled, and the output power is therefore reduced.

The voltage on $C_{f2}$ is the same as the voltage on $L_{f2}$, so the output side current $I_2$ can be expressed as:

$$I_2 = \dfrac{-V_{Cf2}}{j\omega L_{f2}} = \dfrac{C_s \cdot C_{f1} \cdot V_1 / (j\omega L_{f2})}{C_1 C_s + C_2 C_s + C_1 C_2} + \dfrac{\omega^2 M_{12} C_{f1} V_1}{j\omega L_{f2}} \quad (33)$$

Considering the parallel resonance between $L_{f2}$ and $C_{f2}$ and the expression (25), (33) can be simplified as:

$$I_2 = \dfrac{-j\omega C_s \cdot C_{f1} C_{f2} \cdot V_1}{C_1 C_s + C_2 C_s + C_1 C_2} + \dfrac{-jM_{12} \cdot V_1}{\omega L_{f1} L_{f2}} \quad (34)$$

As an H-bridge diode rectifier can be used in FIG. 9 at the output side, the fundamental output current ($-I_2$) and output voltage $V_2$ are in phase with each other. Therefore, the output power can be expressed in (35).

$$P_{out} = |V_2| \cdot |(-I_2)| = \frac{\omega C_s \cdot C_{f1} C_{f2} |V_1||V_2|}{C_1 C_s + C_2 C_s + C_1 C_2} + \frac{M_{12} |V_1||V_2|}{\omega L_{f1} L_{f2}} \quad (35)$$

In expression (35), the first term is determined by the capacitive power transfer, and the second term is determined by the inductive power transfer:

$$\begin{cases} P_{CPT} = \dfrac{\omega C_s \cdot C_{f1} C_{f2} \cdot |V_1| \cdot |V_2|}{C_1 C_s + C_2 C_s + C_1 C_2} \\ P_{IPT} = \dfrac{M_{12} \cdot |V_1| \cdot |V_2|}{\omega L_{f1} L_{f2}} \end{cases} \quad (36)$$

Equation (34) indicates that the output current $(-I_2)$ leads the input voltage $V_1$ by 90°. In the H-bridge diode rectifier, the output current $(-I_2)$ and the output voltage $V_2$ are in phase. Therefore, the output voltage $V_2$ is leading the input voltage $V_1$ by 90°.

Second, FIG. 10(c) can be used to calculate the input current and input power. It can be emphasized again that the input current only depends on the output voltage as shown in FIG. 10(c). Similar to the previous analysis, the input current $I_1$ can be expressed as:

$$I_1 = \frac{-V_{C_{f1}}}{j\omega L_{f1}} = \frac{-j\omega C_s \cdot C_{f1} C_{f2} \cdot V_2}{C_1 C_s + C_2 C_s + C_1 C_2} + \frac{-jM_{12} V_2}{\omega L_{f1} L_{f2}} \quad (37)$$

This equation shows that the output voltage $V_2$ is leading the input current $I_1$ by 90°. Since the previous analysis proves that the output voltage $V_2$ is also leading the input voltage $V_1$ by 90°, the input voltage $V_1$ and current $I_1$ are in phase with each other. Therefore the input power can be expressed as:

$$P_{in} = |V_1| \cdot |I_1| \cdot \cos(\varphi_{V_1} \varphi_{I_1}) = |V_1| \cdot |I_1| \quad (38)$$

Expression (39) shows that unity power factor can be realized at the input side and there is no reactive power injected into the resonant tank. Therefore, there is no extra conduction loss induced by the circulating reactive current, and the efficiency of the resonant circuit can be very high.

Combining (37) and (38), the input power is further expressed as:

$$P_{in} = |V_1| \cdot |I_1| = \frac{\omega C_s \cdot C_{f1} C_{f2} \cdot |V_1||V_2|}{C_1 C_s + C_2 C_s + C_1 C_2} + \frac{M_{12} \cdot |V_1||V_2|}{\omega L_{f1} L_{f2}} \quad (39)$$

Comparing (35) and (39), it shows that the input power is the same as the output power, which is consistent with the previous assumption that the losses in all the components are neglected. According to reference [30], the relationship between $C_1$, $C_2$, and $C_s$ satisfies $C_1 \gg C_s$ and $C_2 \gg C_s$. So (35) and (39) can be further simplified as:

$$P_{in} = P_{out} \approx \omega C_s \cdot \frac{C_{f1} C_{f2}}{C_1 C_2} \cdot |V_1||V_2| + \frac{k\sqrt{L_1 L_2}}{\omega L_1 L_2} \cdot |V_1||V_2| \quad (40)$$

Inductive Coupler Design

The switching frequency may be specified at the beginning of the coupler design. From equation (36), $P_{CPT}$ is proportional to the coupling capacitor $C_s$, which can be in the pF range, so the switching frequency has to be increased to the MHz level to achieve the desired power transfer by the capacitors. Since the inductive couplers (aka "coils") share the same frequency as the capacitive couplers (plates), the switching frequency may be limited to reduce the skin effect. As a result, the frequency is set to 1 MHz, for exemplary purposes.

Figure 11A:
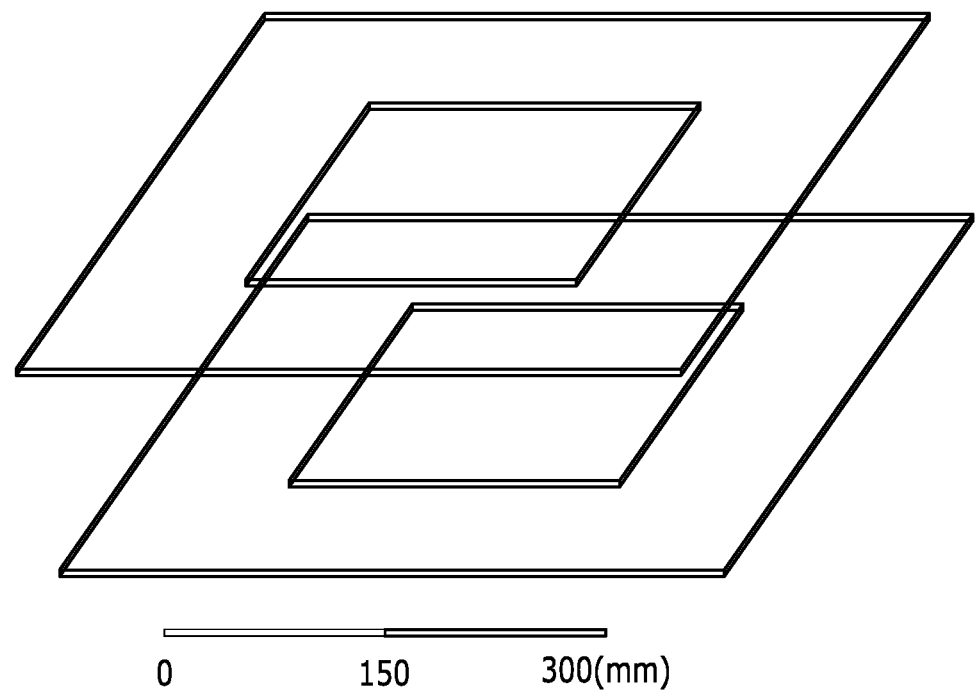
FIGS. 11(a) and 11(b) illustrate a 3-D view and front view, respectively, of exemplary coils, according to an exemplary embodiment.
Figure 11B:
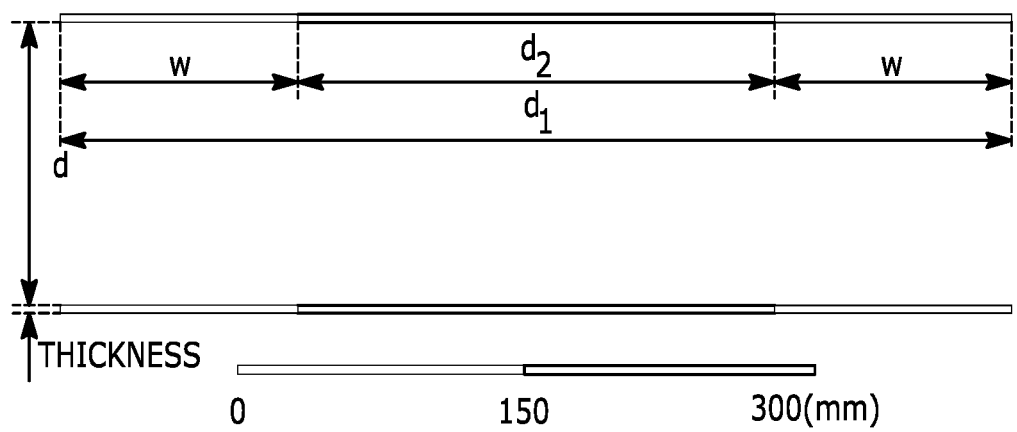

Exemplary dimensions of the coils are shown in FIGS. 11(a) and 11(b), where $d_1$ is the outer length of the coil, $d_2$ is the inner length, d is the air gap, and w is the coil width. The width ratio is defined as $r_w = w/d1$. The coil has a square shape, in the depicted example, and the air-gap distance can be 150 mm, for exemplary purposes. The coil thickness has little effect on the coupling coefficient, and is determined by the Litz-wire diameter. In this case, the thickness can be 3.2 mm, for example.

Figure 12A:
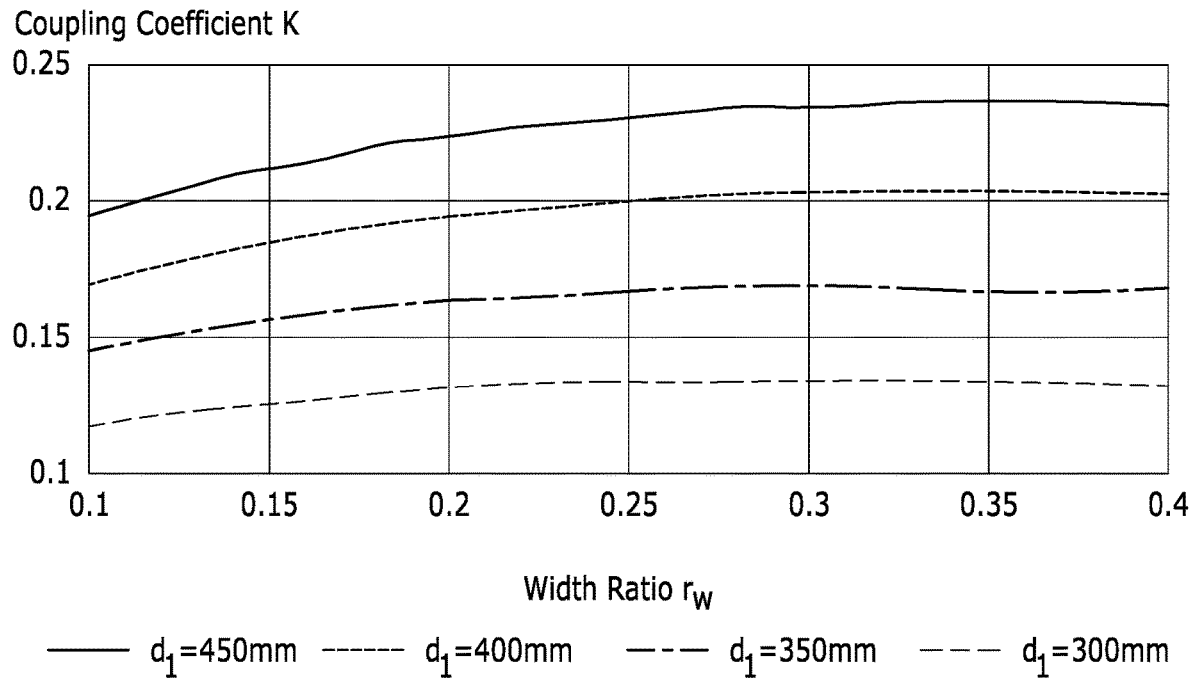
FIG. 12(a) illustrates a graphical representation of a coupling coefficient with respect to a width ratio, at various distances, according to various embodiments.
Figure 12B:
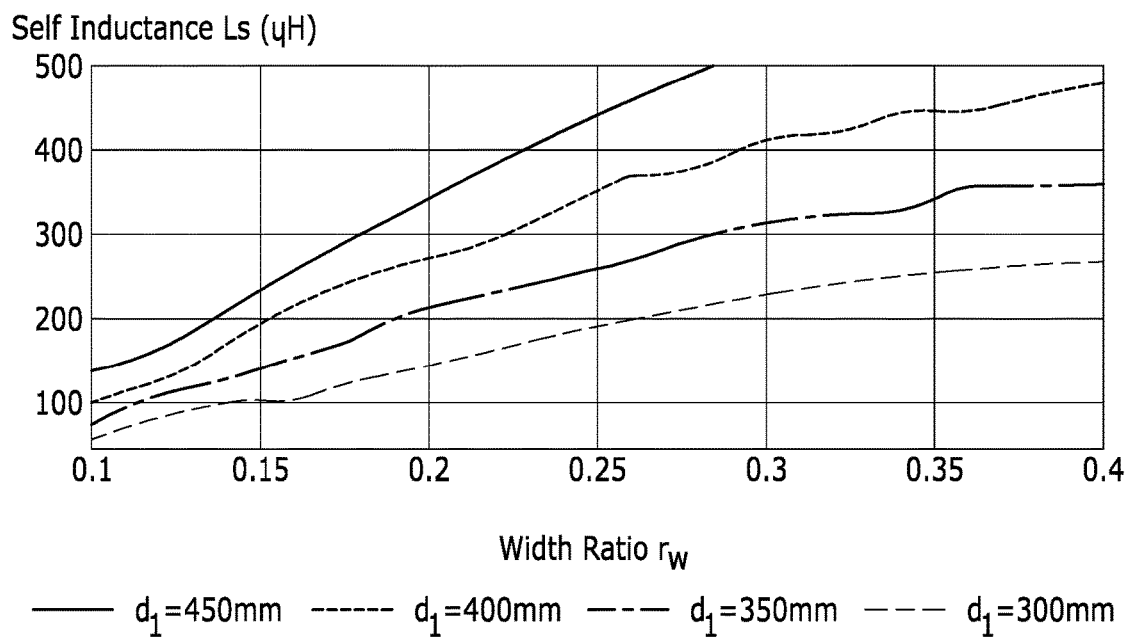
FIG. 12(b) illustrates a graphical representation of self-inductance with respect to width ratio, at various distances, according to various embodiments.

The coupling coefficient k and self-inductance $L_s$ of the coils are simulated in Maxwell, and shown in FIGS. 12(a) and 12(b), for exemplary purposes. FIG. 12(a) indicates that the coupling coefficient k is mostly determined by the coil outer length d1. When $d_1$ is between 300 mm to 450 mm, k is in the range of 0.1 to 0.25. FIG. 12(b) shows that the self-inductance $L_s$ can be regulated by varying the width ratio $r_w$ without affecting coupling coefficient.

In the IPT-CPT combined system, the coils can resonate with the metal plates. Therefore, the coil size potentially cannot be decided without considering the dimension of the plates. The balancing of the output power of the IPT and CPT system is also an important specification, according to certain embodiments.

This exemplary embodiment utilizes both inductive and capacitive coupling to transfer power. It may be helpful to determine the power ratio of each part, which is the percentage of their contributions. Since the IPT and CPT coupler have similar physical size, they can be designed to transfer the same order of magnitude of power to the load. According to (25), the power ratio of inductive power to capacitive power can be defined as:

$$r_{I-C} = \frac{P_{IPT}}{P_{CPT}} = \frac{M_{12} \cdot (C_1 C_s + C_2 C_s + C_1 C_2)}{\omega L_{f1} L_{f2} \cdot \omega C_s \cdot C_{f1} C_{f2}} \quad (41)$$

Considering (25), (26), and (31), (41) can be simplified as:

$$r_{I-C} = \frac{P_{IPT}}{P_{CPT}} = \frac{\omega^2 k \sqrt{L_1 L_2} \cdot (C_1 C_s + C_2 C_s + C_1 C_2)}{C_s} \quad (42)$$

Since $L_1 = L_2$ and $C_1 = C_2$, (42) can be further rewritten:

$$r_{I-C} = \frac{P_{IPT}}{P_{CPT}} = \frac{\omega^2 k \cdot L_1 C_1 (2C_s + C_1)}{C_s} \quad (43)$$

Since $L_1$, $C_{f1}$, and $C_{p1}$ form a parallel resonance, the inductor $L_1$ can be replaced by the capacitor $C_{f1}$ and $C_{p1}$.

$$r_{I-C} = \frac{P_{IPT}}{P_{CPT}} = k \cdot \frac{C_1}{C_s} \cdot \frac{C_1 + 2C_s}{C_1 + C_sC_s/(C_1 + C_s)} \cdot \frac{C_{p1} + C_{f1}}{C_{f1}} \quad (44)$$

It is known that $C_{f1} \gg C_{p1}$, so (44) is approximated as:

$$r_{I-C} = \frac{P_{IPT}}{P_{CPT}} \approx k \cdot \frac{C_1}{C_s} \cdot \frac{C_1 + 2C_s}{C_1 + C_sC_s/(C_1 + C_s)} \quad (45)$$

The capacitor ratio between $C_1$ and $C_s$ can be defined as $k_C = C_s/C_1$. Therefore, the power ratio can be written as:

$$r_{I-C} = \frac{P_{IPT}}{P_{CPT}} \approx \frac{k}{k_C} \cdot \frac{1 + 2 \cdot k_C}{1 + k_C^2/(1 + k_C)} \quad (46)$$

Figure 13:
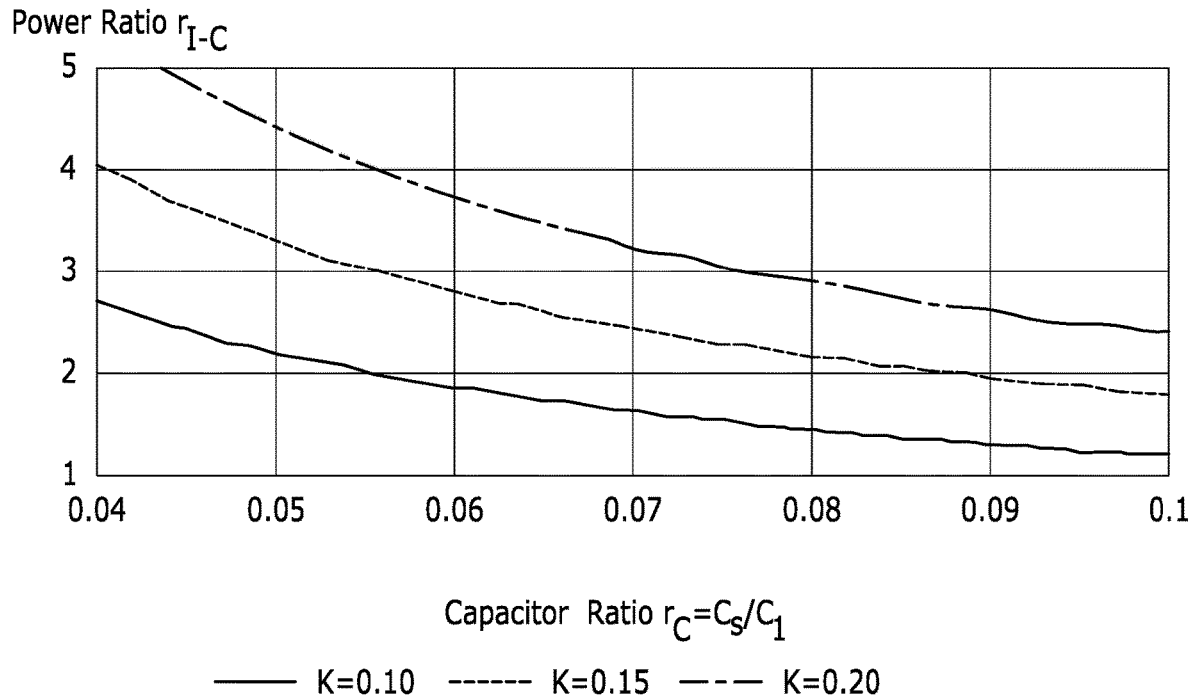
FIG. 13 illustrates a graphical representation of power ratios with respect to capacitor ratio, using various coupling coefficients, according to various embodiments.

FIG. 12(a) shows that the coupling coefficient k varies from 0.10 to 0.20, and it can be considered that the capacitor ratio $k_c$ can varies from 0.04 to 0.10, according to various embodiments. Therefore, the power ratio between the IPT and CPT system is shown in FIG. 13, in which the IPT system contributes more to the output power.

In order to get significant power transfer through CPT coupling, the maximum power ratio can be set to be 3.0, according to one example. The coil length is set to be 300 mm and the coupling coefficient is 0.130. Substitution of $V_{in}$, $V_{out}$, k, $C_s$, and $P_{in}$ to (25), (26), (39), and (44), shows that C1 determines the percentage contribution of IPT and CPT, and also the inductance value $L_1$. Considering the space limitation for the coil, according to certain possible applications, its inductance $L_1$ should not be too large, in some embodiments, so the minimum power ratio can be set at 2.0, for example. Therefore, the acceptable power ratio could be between 2.0 to 3.0, in the current example.

Figure 14:
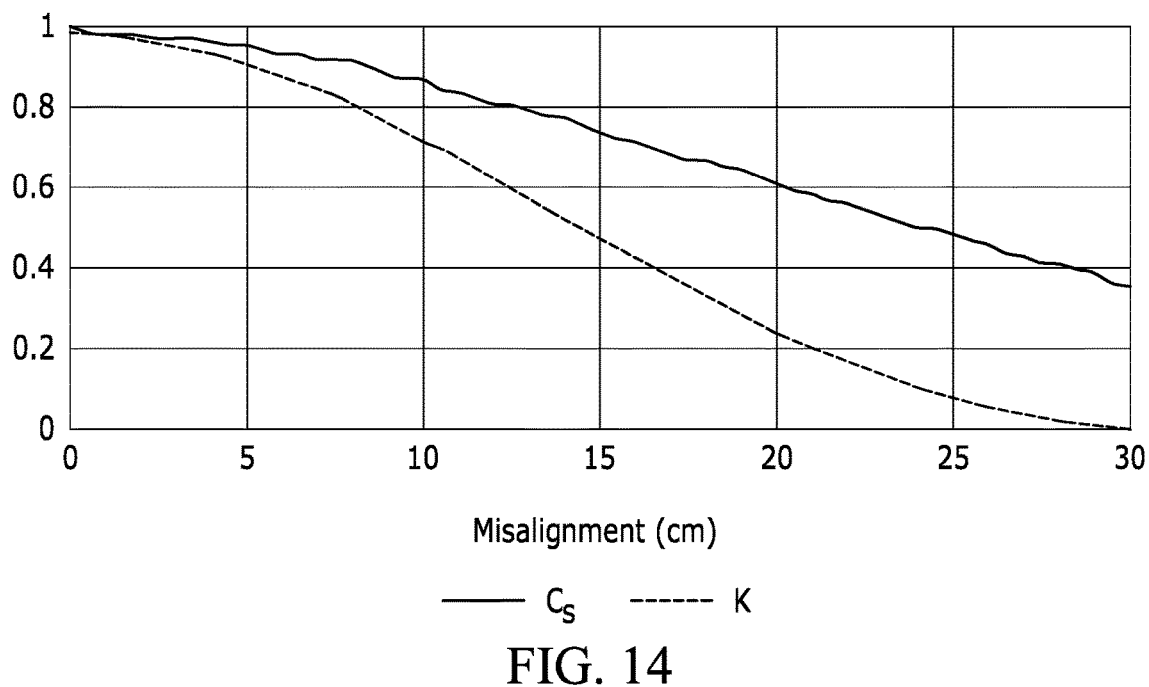
FIG. 14 illustrates a graphical representation of normalized values of capacitance $C_s$ and coupling coefficient k at various misalignments, according to various embodiments.

Exemplary dimensions of various components are provided below in Table IV. The normalized values of coupling capacitor $C_s$ and inductive coupling coefficient k at different misalignment conditions are shown in FIG. 14. It shows that, in this system, the capacitive coupler has better misalignment ability than the inductive coupler.

TABLE IV

| Parameter | Design Value | Parameter | Design Value |
| --- | --- | --- | --- |
| $V_{in}$ | 310 V | $V_{out}$ | 320 V |
| $P_{IPT}$ | 2160 W (72%) | $P_{CPT}$ | 840 W (28%) |
| $d_1$ | 300 mm | $l_1$ | 610 mm |
| $d_2$ | 90 mm | $l_2$ | 457 mm |
| d | 150 mm | $d_c$ | 25 mm |
| $r_w$ | 0.35 | $r_p$ | 0.75 |
| k | 0.130 | $k_c$ | 0.052 |
| $f_{sw}$ | 1 MHz | $C_s$ | 5.0 pF |
| $L_{f1}$ | 14.2 µH | $L_{f2}$ | 14.2 µH |
| $C_{f1}$ | 1.78 nF | $C_{f2}$ | 1.78 nF |
| $L_1$ | 256.2 µH | $L_2$ | 264.1 µH |
| $C_1$ | 96.1 pF | $C_2$ | 96.1 pF |

It should be noted that all of the dimensions and variables are defined herein for exemplary purposes only, in order to aid in the understanding of the circuitry and overall systems. The exemplary dimensions are not intended to limit the scope of the disclosure in any way, and one of ordinary skill in the art would realize that various alternative values could be input instead.

As one practical application of the systems described herein, the primary and secondary sides of capacitive coupler designs as described herein may be incorporated into a roadway and an electric vehicle (EV), respectively, in order to charge a battery in the EV, for example. A capacitive-coupled roadway power electric vehicle system 100 is presented in FIG. 15. The capacitive-coupled roadway power electric vehicle system 100 can include: (1) an electric vehicle (EV); and (2) a roadway network over which the vehicle travels. The electric vehicle includes onboard energy storage devices that can be rapidly recharged or energized with energy obtained from an electrical current. The EV further includes an energy receiving device. The energy storage device of the vehicle will be charged while the vehicle is in operation. The roadway network includes a network of roadway electric power sending modules, including circuitry, that have been electrified with a multiplicity of roadway power segments embedded in or on the roadway. The EV can be recharged while the EV is moving on the roadway. As the vehicle passes over such capacitive-coupling power sending roadway, electric power is capacitvely coupled to the electric vehicle through the sending plates (primary side) in the roadway to the receiving plates (secondary side) mounted on the chassis of the vehicle, for example.

Figure 15:
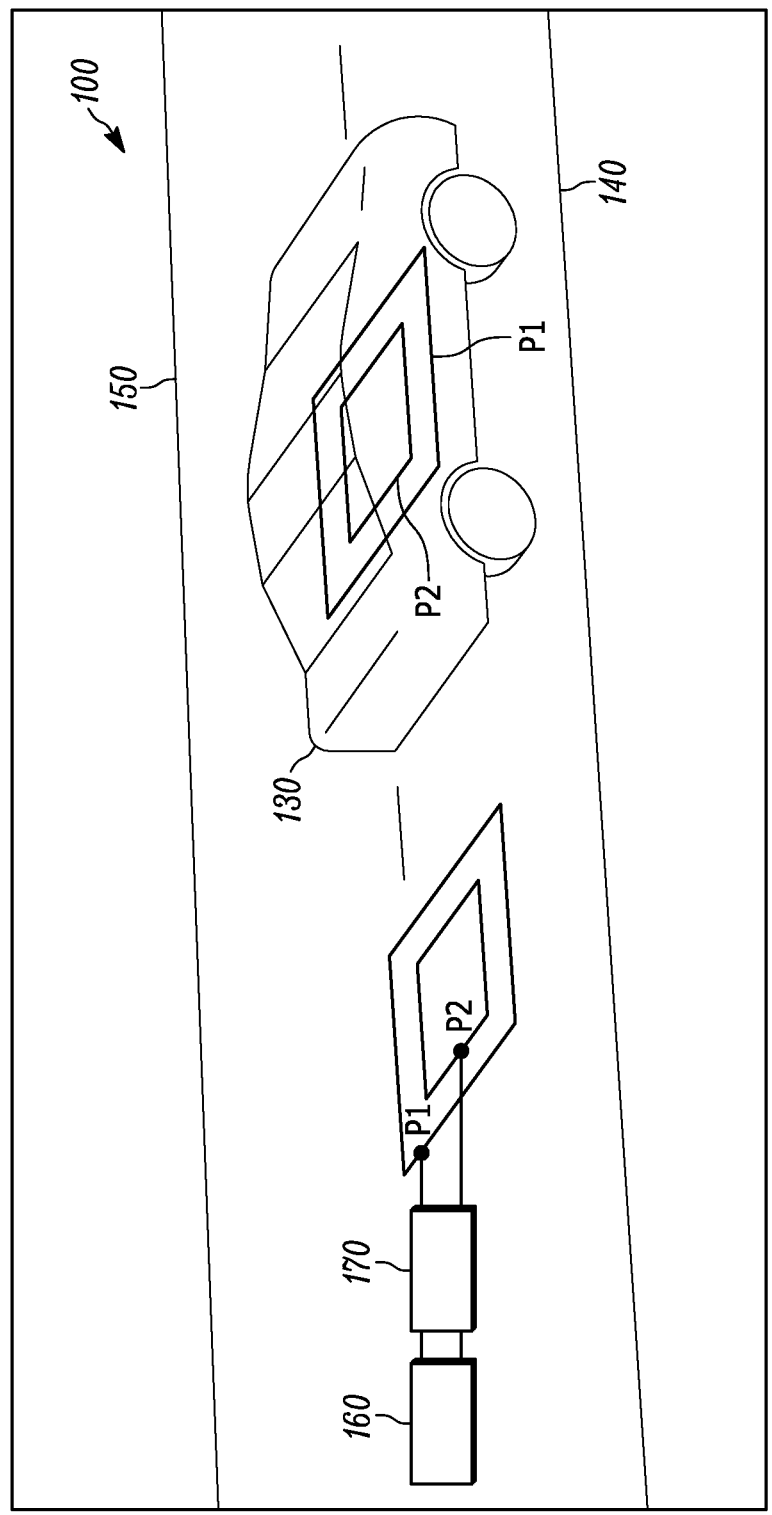
FIG. 15 illustrates a practical example of an electric vehicle (EV)-charging roadway implementing wireless capacitive power transfer according to various embodiments described herein.

Referring to FIG. 15, an EV 130 is shown traversing in a capacitive-coupled roadway power system 100 with power sending plates thereon made in accordance with the present disclosure. As illustrated in FIG. 15, the EV 130 is of a conventional form having a conventional wheel system for support of the vehicle 130 above the road surface. In one embodiment, the roadway energy sending part includes a pair of road surface mounted metal plates with high conductivity P1 and P2. The two sending plates are distributed between the left edge of the road 140 to the right edge of the road 150.

In one embodiment, the roadway power EV system 100 has one power source 160 for each power sending segment. Each power sending segment can power one or more EVs 130. The power requirement of each segment is decided by the number of vehicles 130 capacitively coupled to the segment. In other embodiments, a power source may power multiple road segments.

As shown in FIG. 15, the roadway can include the primary side of power transfer unit 170 coupled to plates p1 and p2, which can include all components depicted, for example, on the left side of the dashed line in FIG. 7 or 9. The primary side of power transfer unit 170 can include inductor(s) and capacitor(s) necessary for working as a low-pass filter on the front end, and a full-bridge inverter generating excitation $V_{in}$. Various processors and memory units (not shown) could be incorporated, as would be apparent to one of ordinary skill in the art. For example, a control system (not shown) may be local or remote and could be incorporated for voltage regulation, etc.

Figure 16:
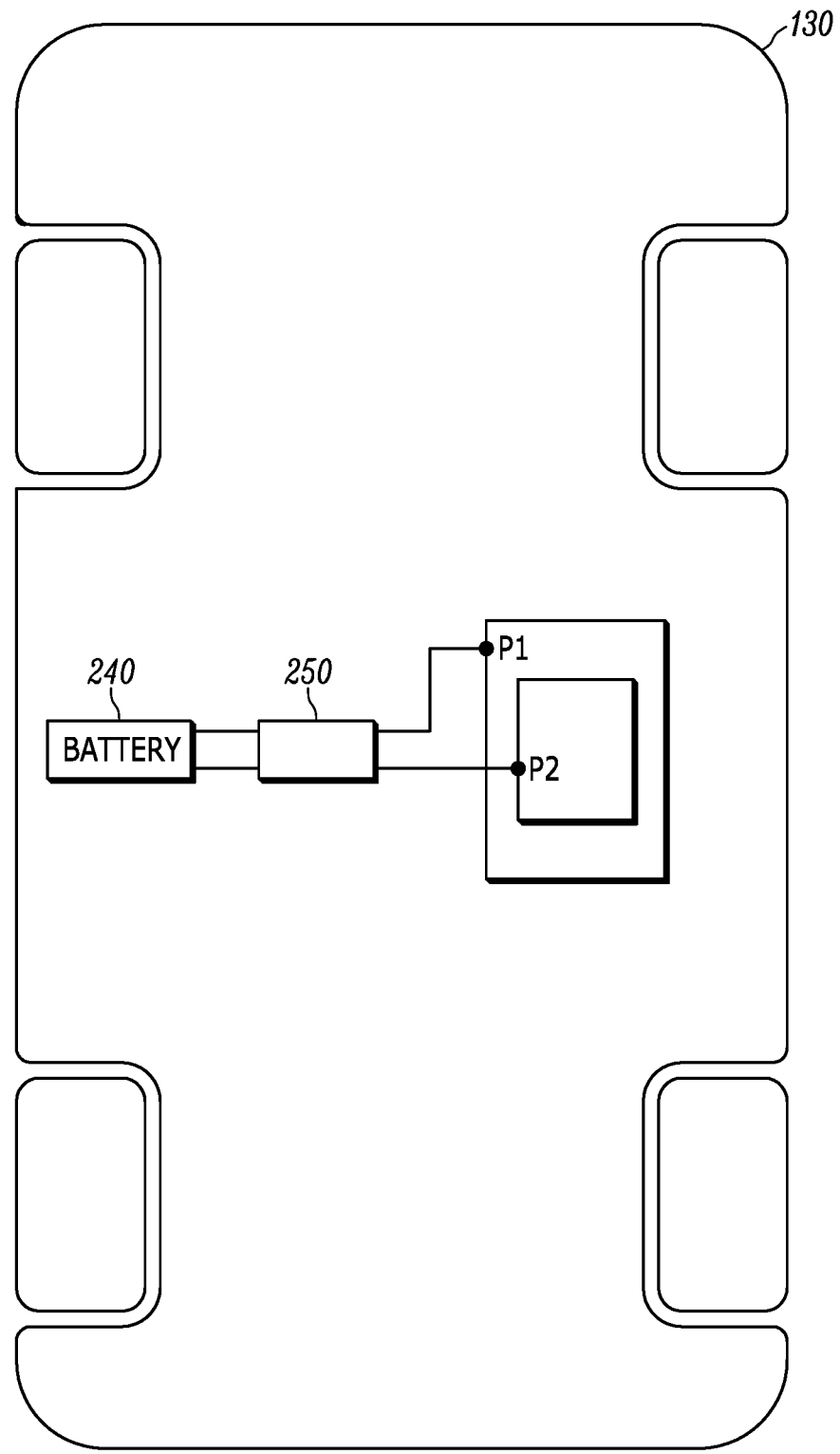
FIG. 16 illustrates an exemplary bottom view of an EV, according to an exemplary embodiment.

FIG. 16 shows a bottom view of the receiving plates P3 and P4 mounted on the chassis of an EV 130. In one embodiment, the energy receiving part on the vehicle chassis includes a pair of plates with the material of high conductivity that are distributed vertically, overlapping, attached under the EV 130. The time varying electric field sent by the sending plate P1 and P2 on the roadway surface is received by the receiving plate P3 and P4 on the vehicle chassis, to charge the onboard energy storage device 240 (e.g., one or more battery packs). Of course various levels of isolation material (not shown) may be implemented at various locations, as needed.

The EV 130 can also include the secondary side of power transfer unit 250 coupled to P3 and P4. Power transfer unit 250 can include all components depicted, for example, on the right side of the dashed line in FIG. 7 or 9. Such components, could include a full-bridge rectifier providing dc current to the output battery, as well as inductor(s) and capacitor(s) working as a low-pass filter. Various processors and memory units (not shown) could be incorporated with power transfer unit 250, as would be apparent to one of ordinary skill in the art.

Moreover, power transfer unit 170, 250 could include coupling coils $L_1$ and $L_2$, respectively, in order to provide additional indicative power along with the capacitive power, as described herein.

Methods described herein may be implemented as software and executed by a general purpose computer. For example, such a general purpose computer may include a control unit/controller or central processing unit ("CPU"), coupled with memory, EPROM, and control hardware. The CPU may be a programmable processor configured to control the operation of the computer and its components. For example, CPU may be a microcontroller ("MCU"), a general purpose hardware processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration. Such operations, for example, may be stored and/or executed by memory unit.

While not specifically shown, the general computer may include additional hardware and software typical of computer systems (e.g., power, cooling, operating system) is desired. In other implementations, different configurations of a computer can be used (e.g., different bus or storage configurations or a multi-processor configuration). Some implementations include one or more computer programs executed by a programmable processor or computer. In general, each computer may include one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A wireless power transfer system, comprising:
   a vertical pair of an inner and an outer coupling capacitors, wherein
   one plate from each of the outer coupling capacitor at least in part overlaps one plate of the inner coupling capacitor on a primary side and another plate from the outer coupling capacitor at least partially overlaps another plate of the inner coupling capacitor on a secondary side,
   each plate of the outer coupling capacitor has a larger area than each plate of the inner coupling capacitor,
   a distance between the primary and secondary sides is larger than distances between the plates of the inner and outer coupling capacitors on each of the primary and secondary sides, respective; and
   a power transfer unit configured to transfer power capacitively through the vertical pair of coupling capacitors, the power transfer unit comprising:
   a first resonant circuit on the primary side and coupled to the inner and outer coupling capacitors, and
   a second resonant circuit on the secondary side and coupled to the inner and outer coupling capacitors.

2. The wireless power transfer system of claim 1, wherein the power transfer unit further comprises:
   a full-bridge inverter on the primary side configured to generate excitation in the first resonant circuit;
   a full-bridge rectifier on the secondary side providing direct current (DC) current to an output battery.

3. The wireless power transfer system of claim 2, wherein the power transfer unit further comprises a battery configured to receive a DC charging signal from the full-bridge rectifier.

4. The wireless power transfer system of claim 3, wherein the battery and the full-bridge rectifier are integrated into a vehicle.

5. The wireless power transfer system of claim 1, wherein the distance between the primary and secondary sides is at least 150 mm.

6. The wireless power transfer system of claim 5, wherein the distance between the plates of the outer and inner coupling capacitors on the primary and secondary sides, respectively, is 10 mm, and
   the ratio of the length of each plate of the inner coupling capacitor and each plate of the outer coupling capacitor is 0.667.

7. The wireless power transfer system of claim 1, wherein the secondary side is integrated into a vehicle.

* * * * *